United States Patent
Inoue et al.

(10) Patent No.: US 10,188,911 B2
(45) Date of Patent: Jan. 29, 2019

(54) GOLF BALL

(71) Applicant: DUNLOP SPORTS CO. LTD., Kobe-shi, Hyogo (JP)

(72) Inventors: Hidetaka Inoue, Kobe (JP); Kazuya Kamino, Kobe (JP)

(73) Assignee: SUMITOMO RUBBER INDUSTRIES, LTD., Kobe-Shi, Hyogo (JP)

(*) Notice: Subject to any disclaimer, the term of this patent is extended or adjusted under 35 U.S.C. 154(b) by 0 days.

(21) Appl. No.: 15/783,042

(22) Filed: Oct. 13, 2017

(65) Prior Publication Data

US 2018/0169479 A1    Jun. 21, 2018

(30) Foreign Application Priority Data

Dec. 15, 2016  (JP) .................................. 2016-243139

(51) Int. Cl.
  *A63B 37/06*   (2006.01)
  *A63B 37/00*   (2006.01)
  *A63B 69/36*   (2006.01)

(52) U.S. Cl.
  CPC ...... *A63B 37/0075* (2013.01); *A63B 37/0092* (2013.01); *A63B 37/0096* (2013.01); *A63B 69/3655* (2013.01)

(58) Field of Classification Search
  CPC .................................................. A63B 37/0092
  USPC .................................................. 473/373, 374
  See application file for complete search history.

(56) References Cited

U.S. PATENT DOCUMENTS

| | | | |
|---|---|---|---|
| 2011/0250991 A1 | 10/2011 | Isogawa et al. | |
| 2013/0005508 A1* | 1/2013 | Matsuyama | A63B 37/0003 473/373 |
| 2013/0172113 A1* | 7/2013 | Isogawa | A63B 37/0003 473/373 |
| 2013/0288824 A1* | 10/2013 | Isogawa | A63B 37/0059 473/373 |
| 2013/0296072 A1 | 11/2013 | Nakajima et al. | |
| 2014/0100059 A1* | 4/2014 | Kimura | A63B 37/0081 473/374 |

FOREIGN PATENT DOCUMENTS

| | | |
|---|---|---|
| JP | 2011-217857 A | 11/2011 |
| JP | 2013-230365 A | 11/2013 |
| JP | 2015-77405 A | 4/2015 |

* cited by examiner

*Primary Examiner* — Raeann Gorden
(74) *Attorney, Agent, or Firm* — Birch, Stewart, Kolasch & Birch, LLP

(57) ABSTRACT

A golf ball 2 includes a core 4, a mid layer 6, and a cover 8. A hardness H75 at a point to which a distance from a central point of the core 4 is 75% of a radius of the core 4 is greater than a hardness H0 at the central point of the core 4. A difference D1=(H75−H0) is not less than 10.0 and not greater than 27.0 in Shore C hardness. A hardness Hs at a surface of the core 4 is greater than the hardness H75. A difference D2=(Hs−H75) is not less than 0 and not greater than 6.5 in Shore C hardness. The hardness H75 is less than a Shore C hardness HmC of the mid layer 6. A Shore D hardness HmD of the mid layer 6 is greater than a Shore D hardness Hc of the cover 8.

10 Claims, 1 Drawing Sheet

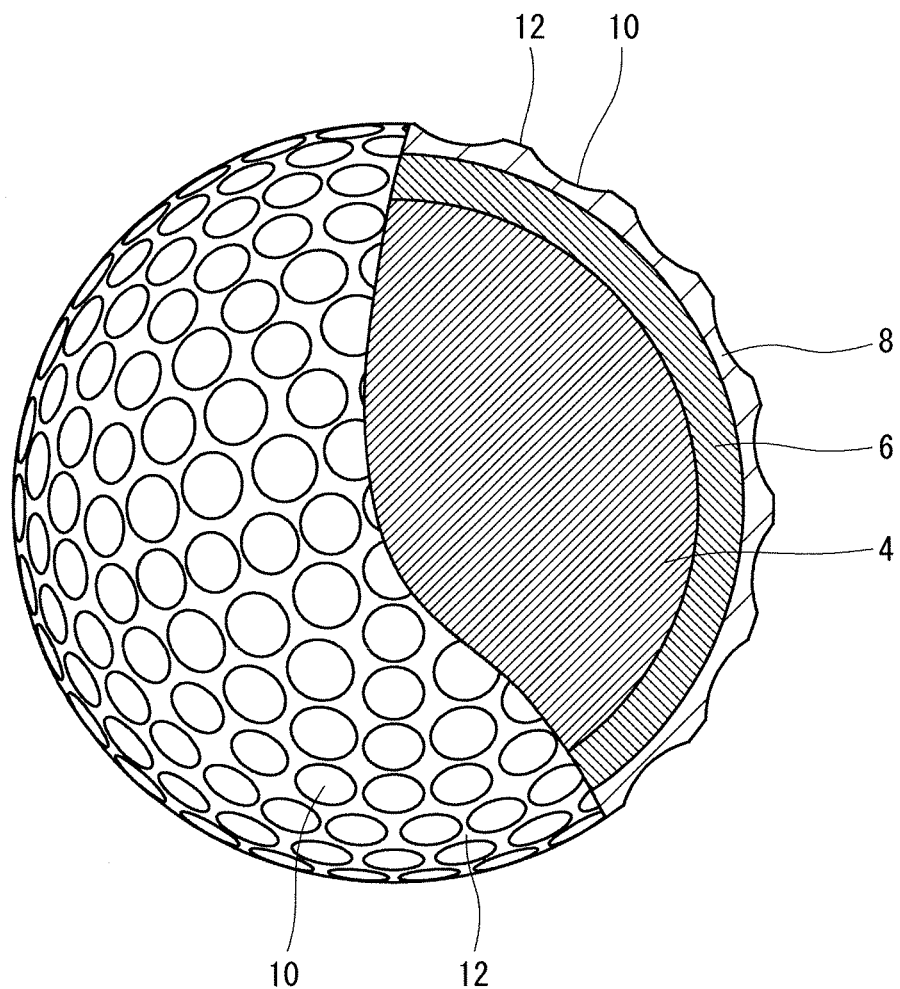

GOLF BALL

This application claims priority on Patent Application No. 2016-243139 filed in JAPAN on Dec. 15, 2016. The entire contents of this Japanese Patent Application are hereby incorporated by reference.

BACKGROUND OF THE INVENTION

Field of the Invention

The present invention relates to golf balls. Specifically, the present invention relates to golf balls including a core, a mid layer, and a cover.

Description of the Related Art

The greatest interest to golf players concerning golf balls is flight performance. Golf players particularly place importance on flight distances upon shots with drivers. A flight distance upon a shot with a driver correlates with the resilience performance of a golf ball. When a golf ball in which a core having high resilience is used is hit, the golf ball flies at a high speed, and a large flight distance is achieved.

In order to obtain a large flight distance upon a shot with a driver, a core having an outer-hard/inner-soft structure may be used. When a golf ball including a core having an outer-hard/inner-soft structure is hit with a driver, the spin rate is suppressed, and the launch angle becomes large. The low spin rate and the large launch angle achieve a large flight distance.

There have been various proposals for improvement of flight performance. For example, JP2011-217857 (US2011/0250991 A1) discloses a golf ball including a core in which: the difference between a JIS-C hardness H(5.0) at a point to which the distance from the central point of the core is 5 mm and a JIS-C hardness Ho at the central point is not less than 6.0; the difference between a JIS-C hardness H(12.5) at a point to which the distance from the central point is 12.5 mm and the hardness H(5.0) is not greater than 4.0; the difference between a JIS-C hardness HS at the surface of the core and the hardness H(12.5) is not less than 10.0; the difference between the hardness HS and the hardness Ho is not less than 22.0; and there is no zone in which the hardness decreases from the central point of the core toward the surface of the core.

JP2013-230365 (US2013/0296072 A1) discloses a golf ball in which a JIS-C hardness ($H_{-14}$) at a position that is inward from the surface of a core toward the central point of the core by 14 mm, a JIS-C hardness ($H_{-8}$) at a position that is inward from the surface of the core toward the central point of the core by 8 mm, a JIS-C hardness ($H_{-6}$) at a position that is inward from the surface of the core toward the central point of the core by 6 mm, and a JIS-C hardness ($H_{-4}$) at a position that is inward from the surface of the core toward the central point of the core by 4 mm satisfy relational expressions of (1) $H_{-14} < 70$, (2) $H_{-8} < 72$, (3) $H_{-6} < 75$, and (4) $H_{-4} - H_{-8} > 8$.

JP2015-77405 (US2014/0100059 A1) discloses a golf ball in which relational expressions of (1) $D - C \geq 7$, (2) $C - B \leq 7$, (3) $(D - C) - (C - B) \leq 7$, and (4) $E - A \geq 16$ are satisfied when the radius of a core is denoted by R (mm), a JIS-C hardness at the central point of the core is denoted by A, a JIS-C hardness at a position away from the central point of the core by R/3 mm is denoted by B, a JIS-C hardness at a position away from the central point of the core by R/1.8 mm is denoted by C, a JIS-C hardness at a position away from the central point of the core by R/1.3 mm is denoted by D, and a JIS-C hardness at the surface of the core is denoted by E.

Golf players also place importance on controllability of golf balls. Particularly, the level of interest to golf players concerning controllability (approach performance) upon approach shots is high. The controllability correlates to the spin rate of a golf ball. When the rate of backspin is high, the run is short. By using a golf ball having a high backspin rate, a golf player can cause the golf ball to stop at a target point. When the rate of sidespin is high, the golf ball tends to curve. By using a golf ball having a high sidespin rate, a golf player can intentionally cause the golf ball to curve.

With a golf ball in which a spin rate upon hitting with a driver is reduced in order to obtain a large flight distance, the spin rate upon an approach shot also becomes low, and the controllability may decrease. Further improvement of a flight distance upon a shot with a driver while satisfying a demand of golf players on controllability is desired.

An object of the present invention is to provide a golf ball having excellent flight performance and approach performance.

SUMMARY OF THE INVENTION

A golf ball according to the present invention includes a spherical core, a mid layer positioned outside the core, and a cover positioned outside the mid layer. A hardness H75 at a point to which a distance from a central point of the core is equal to 75% of a radius of the core is greater than a hardness H0 at the central point of the core. A difference D1=(H75−H0) between the hardness H75 and the hardness H0 is not less than 10.0 and not greater than 27.0 in Shore C hardness. A hardness Hs at a surface of the core is greater than the hardness H75. A difference D2=(Hs−H75) between the hardness Hs and the hardness H75 is not less than 0 and not greater than 6.5 in Shore C hardness. The hardness H75 is less than a Shore C hardness HmC of the mid layer. A Shore D hardness HmD of the mid layer is greater than a Shore D hardness Hc of the cover.

In the golf ball according to the present invention, the hardness distribution within the core and the hardness distribution of the entire golf ball are appropriate. By the appropriate hardness distributions, the resilience performance of the golf ball improves. When the golf ball is hit, the flight speed is high. By the high flight speed, a large flight distance is obtained. When the golf ball is hit, an excessive decrease in the spin rate is suppressed. With the golf ball, controllability upon an approach shot is not greatly impaired. The golf ball has excellent flight performance and approach performance.

Preferably, a ratio (D2/D1) of the difference D2 to the difference D1 is not greater than 0.30 in Shore C hardness.

Preferably, a hardness H25 at a point to which a distance from the central point of the core is equal to 25% of the radius of the core is greater than the hardness H0. A difference D3=(H25−H0) between the hardness H25 and the hardness H0 is not less than 7.0 in Shore C hardness.

Preferably, a difference D4=(H50−H25) between a hardness H50 at a point to which a distance from the central point of the core is equal to 50% of the radius of the core and the hardness H25 is not less than −3.0 and not greater than 3.0 in Shore C hardness.

Preferably, the hardness H75 is greater than the hardness H50. A difference D5=(H75−H50) between the hardness H75 and the hardness H50 is not less than 6.0 in Shore C hardness.

Preferably, a difference D6=(HmC−H75) between the hardness HmC and the hardness H75 is not less than 7.0 in Shore C hardness.

Preferably, the hardness HmC is greater than the hardness Hs. A difference D7=(HmC−Hs) between the hardness HmC and the hardness Hs is not less than 4.0 in Shore C hardness.

Preferably, a difference D8=(HmD−Hc) between the hardness HmD and the hardness Hc is not less than 20.0 in Shore D hardness.

Preferably, the core is formed from a rubber composition. The rubber composition of the core includes (a) a base rubber, (b) a co-crosslinking agent that is an α,β-unsaturated carboxylic acid having 3 to 8 carbon atoms and/or a metal salt thereof, (c) a crosslinking initiator, and (d) an unsaturated fatty acid and/or a metal salt thereof (except the α,β-unsaturated carboxylic acid having 3 to 8 carbon atoms and the metal salt thereof).

Preferably, a number of carbon atoms of a fatty acid component of the unsaturated fatty acid and/or the metal salt thereof (d) is not less than 4 and not greater than 33. Preferably, the unsaturated fatty acid and/or the metal salt thereof (d) has one or two carbon-carbon double bonds.

BRIEF DESCRIPTION OF THE DRAWINGS

FIG. 1 is a partially cutaway cross-sectional view of a golf ball according to an embodiment of the present invention.

DESCRIPTION OF THE PREFERRED EMBODIMENTS

The following will describe in detail the present invention based on preferred embodiments with appropriate reference to the drawings.

A golf ball 2 shown in FIG. 1 includes a spherical core 4, a mid layer 6 positioned outside the core 4, and a cover 8 positioned outside the mid layer 6. The golf ball 2 has a plurality of dimples 10 on the surface thereof. Of the surface of the golf ball 2, a part other than the dimples 10 is a land 12. The golf ball 2 includes a paint layer and a mark layer on the external side of the cover 8 although these layers are not shown in the drawing. The golf ball 2 may include another layer between the core 4 and the mid layer 6. The golf ball 2 may include another layer between the mid layer 6 and the cover 8.

The golf ball 2 preferably has a diameter of not less than 40 mm and not greater than 45 mm. From the viewpoint of conformity to the rules established by the United States Golf Association (USGA), the diameter is particularly preferably not less than 42.67 mm. In light of suppression of air resistance, the diameter is more preferably not greater than 44 mm and particularly preferably not greater than 42.80 mm. The golf ball 2 preferably has a weight of not less than 40 g and not greater than 50 g. In light of attainment of great inertia, the weight is more preferably not less than 44 g and particularly preferably not less than 45.00 g. From the viewpoint of conformity to the rules established by the USGA, the weight is particularly preferably not greater than 45.93 g.

In light of resilience performance of the golf ball 2, the spherical core 4 has a diameter of preferably not less than 34.8 mm, more preferably not less than 36.8 mm, and particularly preferably not less than 38.8 mm. From the viewpoint that the mid layer 6 and the cover 8 can have sufficient thicknesses, this diameter is preferably not greater than 41.0 mm, more preferably not greater than 40.5 mm, and particularly preferably not greater than 40.0 mm. The core 4 has a radius of preferably not less than 17.4 mm, more preferably not less than 18.4 mm, and particularly preferably not less than 19.4 mm. The radius of the core 4 is preferably not greater than 20.5 mm, more preferably not greater than 20.25 mm, and particularly preferably not greater than 20.0 mm. The core 4 has a weight of preferably not less than 10 g and not greater than 40 g.

In the golf ball 2, on a cut plane of the core 4 that has been cut into two halves, a hardness H0 at the central point of the core 4, a hardness H25 at a point to which the distance from the central point is equal to 25% of the radius of the core 4, a hardness H50 at a point to which the distance from the central point is equal to 50% of the radius of the core 4, a hardness H75 at a point to which the distance from the central point is equal to 75% of the radius of the core 4, and a hardness Hs at the surface of the core 4 are measured. A Shore C type hardness scale mounted to an automated hardness meter (trade name "digi test II" manufactured by Heinrich Bareiss Prüfgerätebau GmbH) is used for measuring each hardness. The hardness H0, the hardness H25, the hardness H50, and the hardness H75 are measured by the hardness scale being pressed against the cut plane of the core 4. The hardness Hs is measured by the hardness scale being pressed against the surface of the core 4. All the measurements are conducted in an environment of 23° C.

In the present invention, the hardness H75 is greater than the hardness H0, and the hardness Hs is greater than the hardness H75. In the core 4, an outer hard/inner soft hardness distribution is formed as a whole. When the golf ball 2 that includes the core 4 having an outer-hard/inner-soft structure is hit with a driver, the spin rate is reduced, and a large launch angle is obtained. Furthermore, in the core 4, when the difference (H75−H0) between the hardness H75 and the hardness H0 is denoted by D1 and the difference (Hs−H75) between the hardness Hs and the hardness H75 is denoted by D2, the difference D1 and the difference D2 are appropriate. By the core 4 having the appropriate difference D1, an excessive decrease in a spin rate can be avoided, and the approach performance can be maintained. By the core 4 having the appropriate difference D2, the resilience performance of the golf ball 2 improves, and a high flight speed is obtained. With the golf ball 2, due to the synergetic effect of the difference D1 and the difference D2, a large flight distance is achieved by an increase in a flight speed while an excessive decrease in a spin rate is avoided.

In the present invention, the difference D1 is not less than 10.0 and not greater than 27.0 in Shore C hardness. In light of contributing to formation of the outer-hard/inner-soft structure of the core 4 thereby to reduce a spin rate, the difference D1 is preferably not less than 12.0 and more preferably not less than 14.0. In light of avoiding an excessive decrease in a spin rate, the difference D1 is preferably not greater than 26.0 and more preferably not greater than 25.0.

In the present invention, the difference D2 is not less than 0 and not greater than 6.5 in Shore C hardness. The difference D2 is small. The hardness gradient near the surface of the core 4 is substantially flat as compared to the hardness gradient in the entirety of the core 4. The resilience coefficient of the core 4 having a substantially flat hardness gradient near the surface thereof is high. In light of resilience performance, the difference D2 is preferably not greater than 6.0 and more preferably not greater than 5.5. In light of spin suppression, the difference D2 is preferably not less than 0.5 and more preferably not less than 1.0.

In light of achievement of both desired flight performance and desired approach performance, the ratio (D2/D1) of the difference D2 to the difference D1 is preferably not greater than 0.30 and more preferably not greater than 0.25. From the same viewpoint, the ratio (D2/D1) is preferably not less than 0 and more preferably not less than 0.05.

In light of outer-hard/inner-soft structure, the golf ball 2 in which the hardness H25 is greater than the hardness H0 is preferable. When the hardness difference (H25−H0) between the hardness H25 and the hardness H0 is denoted by D3, the difference D3 is preferably not less than 7.0, more preferably not less than 7.5, and further preferably not less than 8.0 in Shore C hardness, in light of spin suppression. In light of approach performance, the difference D3 is preferably not greater than 15.0, more preferably not greater than 14.0, and further preferably not greater than 13.0.

When the hardness difference (H50−H25) between the hardness H50 and the hardness H25 is denoted by D4, the difference D4 is preferably not less than −3.0, more preferably not less than −2.0, and further preferably not less than −1.0 in Shore C hardness, in light of spin suppression. In light of approach performance, the difference D4 is preferably not greater than 3.0, more preferably not greater than 2.5, and further preferably not greater than 2.0.

In light of outer-hard/inner-soft structure, the golf ball 2 in which the hardness H75 is greater than the hardness H50 is preferable. When the hardness difference (H75−H50) between the hardness H75 and the hardness H50 is denoted by D5, the difference D5 is preferably not less than 6.0, more preferably not less than 7.0, and further preferably not less than 8.0 in Shore C hardness, in light of spin suppression. In light of approach performance, the difference D5 is preferably not greater than 13.0, more preferably not greater than 12.0, and further preferably not greater than 11.0.

In light of outer-hard/inner-soft structure, the golf ball 2 in which the hardness Hs is greater than the hardness H0 is preferable. In light of spin suppression, the hardness difference (Hs−H0) between the hardness Hs and the hardness H0 is preferably not less than 19.0, more preferably not less than 21.0, and further preferably not less than 22.0 in Shore C hardness. In light of approach performance, the hardness difference (Hs−H0) is preferably not greater than 30.0 and more preferably not greater than 28.0.

As shown, each of the mid layer 6 and the cover 8 of the golf ball 2 according to this embodiment is composed of a single layer. In the golf ball 2, slab hardnesses of the mid layer 6 and the cover 8 are measured. In a golf ball according to another embodiment of the present invention, the mid layer 6 may be formed of a plurality of layers, and the cover 8 may be formed of a plurality of layers. In the golf ball that includes the mid layer 6 composed of the plurality of layers, a slab hardness of the layer adjacent to the core 4, among the plurality of layers forming the mid layer 6, is measured. In the golf ball that includes the cover 8 composed of the plurality of layers, a slab hardness of the layer located at the outermost layer, among the plurality of layers forming the cover 8, is measured.

The slab hardnesses of the mid layer 6 and the cover 8 are measured according to the standards of "ASTM-D 2240-68". For the measurement, a sheet that is formed by hot press, that is formed from the same material as that of the mid layer 6 or the cover 8, and that has a thickness of about 2 mm is used. Prior to the measurement, a sheet is kept at 23° C. for two weeks. At the measurement, three sheets are stacked. A Shore C hardness HmC of the mid layer 6 is obtained by an automated hardness meter (the aforementioned "digi test II") to which a Shore C type hardness scale is mounted. A Shore D hardness HmD of the mid layer 6 and a Shore C hardness Hc of the cover 8 are obtained by an automated hardness meter (the aforementioned "digi test II") to which a Shore D type hardness scale is mounted.

In the present invention, the hardness H75 is less than the hardness HmC. In the golf ball 2, an outer-hard/inner-soft structure can be formed in the sphere composed of the core 4 and the mid layer 6. When the hardness difference (HmC−H75) between the hardness HmC and the hardness H75 is denoted by D6, the difference D6 is preferably not less than 7.0, more preferably not less than 8.0, and further preferably not less than 9.0 in Shore C hardness, in light of spin suppression. In light of approach performance, the difference D6 is preferably not greater than 25.0 and more preferably not greater than 22.0.

In light of outer-hard/inner-soft structure, the golf ball 2 in which the hardness HmC is greater than the hardness Hs is preferable. When the hardness difference (HmC−Hs) between the hardness HmC and the hardness Hs is denoted by D7, the difference D7 is preferably not less than 4.0, more preferably not less than 6.0, and further preferably not less than 7.0 in Shore C hardness, in light of spin suppression. In light of approach performance, the difference D7 is preferably not greater than 22.0 and more preferably not greater than 20.0.

In the present invention, the hardness HmD is greater than the hardness Hc. With the golf ball 2, an excessive decrease in a spin rate upon an approach shot is suppressed. When the hardness difference (HmD−Hc) between the hardness HmD and the hardness Hc is denoted by D8, the difference D8 is preferably not less than 20.0, more preferably not less than 22.0, and further preferably not less than 24.0 in Shore D hardness, in light of approach performance. In light of spin performance and durability, the difference D8 is preferably not greater than 45.0 and more preferably not greater than 42.0.

In the present invention, the hardness H0 at the central point of the core 4, the hardness H25 at the point to which the distance from the central point is equal to 25% of the radius of the core 4, the hardness H50 at the point to which the distance from the central point is equal to 50% of the radius of the core 4, the hardness H75 at the point to which the distance from the central point is equal to 75% of the radius of the core 4, and the hardness Hs at the surface of the core 4 are not particularly limited, and are set as appropriate within a range in which the aforementioned difference D1 between the hardness H75 and the hardness H0, the aforementioned difference D2 between the hardness Hs and the hardness H75, and the aforementioned magnitude relationships with the hardness HmC of the mid layer 6 are satisfied.

In light of approach performance, the core 4 has an amount of compressive deformation Dc of preferably not less than 1.90 mm, more preferably not less than 2.00 mm, and further preferably not less than 2.10 mm. In light of resilience performance, the amount of compressive deformation Dc of the core 4 is preferably not greater than 5.00 mm and more preferably not greater than 4.80 mm. A method for measuring the amount of compressive deformation Dc of the core 4 will be described later.

In the present invention, the hardness of the mid layer 6 is not particularly limited, and is set as appropriate within a range in which the aforementioned magnitude relationships with the hardness H75 and the hardness Hc are satisfied. In light of spin suppression, the Shore C hardness HmC of the mid layer 6 is preferably not less than 65, more preferably not less than 68, and particularly preferably not less than 70. In light of approach performance, the hardness HmC is preferably not greater than 100, more preferably not greater than 99, and particularly preferably not greater than 98. The Shore D hardness HmD of the mid layer 6 is preferably not less than 40, more preferably not less than 42, and particularly preferably not less than 44. The hardness HmD is preferably not greater than 76, more preferably not greater than 74, and particularly preferably not greater than 72.

In light of spin suppression, the mid layer 6 has a thickness Tm of preferably not less than 0.5 mm, more preferably not less than 0.8 mm, and further preferably not less than 1.0 mm. From the viewpoint that resilience performance of the core 4 can be exerted, the thickness Tm is preferably not greater than 4.0 mm, more preferably not greater than 3.5 mm, and further preferably not greater than 3.0 mm. When the mid layer 6 is formed of a plurality of layers, the sum of the thicknesses of the respective layers is regarded as the thickness Tm. The thickness Tm is measured at a position immediately below the land 12.

In the present invention, the Shore D hardness Hc of the cover 8 is not particularly limited, and is set as appropriate within a range in which the aforementioned magnitude relationship with the hardness HmD is satisfied. In light of approach performance and feel at impact, the hardness Hc is preferably not greater than 50, more preferably not greater than 48, and further preferably not greater than 46. In light of spin suppression, the hardness Hc is preferably not less than 20, more preferably not less than 23, and further preferably not less than 25.

In light of spin suppression, the cover 8 has a thickness Tc of preferably not greater than 3.0 mm, more preferably not greater than 2.5 mm, and particularly preferably not greater than 2.0 mm. In light of approach performance and durability, the thickness Tc is preferably not less than 0.3 mm, more preferably not less than 0.4 mm, and further preferably not less than 0.5 mm.

In light of approach performance and feel at impact, the golf ball 2 has an amount of compressive deformation Db of preferably not less than 1.8 mm and more preferably not less than 2.0 mm. In light of resilience performance, the amount of compressive deformation Db of the golf ball 2 is preferably not greater than 6.0 mm and more preferably not greater than 5.0 mm.

In measurement of an amount of compressive deformation, a sphere such as the core 4, the golf ball 2, and the like is placed on a hard plate made of metal. Next, a cylinder made of metal gradually descends toward the sphere. The sphere, squeezed between the bottom face of the cylinder and the hard plate, becomes deformed. A migration distance of the cylinder, starting from the state in which an initial load of 98 N is applied to the sphere up to the state in which a final load of 1274 N is applied thereto, is measured as an amount of compressive deformation.

The following will sequentially describe preferable constituent materials for the core 4, the mid layer 6, and the cover 8 in this embodiment, and the golf ball 2 may further include a layer formed from another constituent material as long as the object of the present invention is achieved.

The core 4 of the golf ball 2 is formed by crosslinking a rubber composition. The rubber composition of the core 4 preferably includes (a) a base rubber, (b) a co-crosslinking agent that is an α,β-unsaturated carboxylic acid having 3 to 8 carbon atoms and/or a metal salt thereof, (c) a crosslinking initiator, and (d) an unsaturated fatty acid and/or a metal salt thereof. In the present invention, the α,β-unsaturated carboxylic acid having 3 to 8 carbon atoms and/or the metal salt thereof, which is the co-crosslinking agent (b), is not included in the unsaturated fatty acid and/or the metal salt thereof (d). In other words, the rubber composition of the core 4 includes the unsaturated fatty acid and/or the metal salt thereof (d) that is different from the α,β-unsaturated carboxylic acid having 3 to 8 carbon atoms and/or the metal salt thereof.

A preferable base rubber (a) is natural rubber and/or synthetic rubber. Examples thereof include polybutadiene rubber, polyisoprene rubber, styrene-butadiene rubber, ethylene-propylene-diene rubber (EPDM), natural rubber, and the like. Two or more of these rubbers may be used in combination. Polybutadiene rubber is preferable.

Polybutadiene rubber includes cis-1,4 bonds and 1,2-vinyl bonds. In light of resilience performance, a high-cis polybutadiene having a high cis-1,4 bond content and a low 1,2-vinyl bond content is more preferable. The content of the cis-1,4 bonds in the high-cis polybutadiene is preferably not less than 40% by weight, more preferably not less than 80% by weight, and further preferably not less than 90% by weight. The content of the 1,2-vinyl bonds is preferably not greater than 2.0% by weight, more preferably not greater than 1.7% by weight, and further preferably not greater than 1.5% by weight.

Polybutadiene rubber obtained by using a rare-earth-element-containing catalyst is preferable. By using the rare-earth-element-containing catalyst, high-cis polybutadiene rubber having a high cis-1,4 bond content and a low 1,2-vinyl bond content is synthesized with excellent polymerization activity. From this viewpoint, polybutadiene rubber synthesized by using a catalyst containing neodymium, which is a lanthanum-series rare earth element compound, is more preferable.

The Mooney viscosity ($ML_{1+4}$(100° C.)) of the high-cis polybutadiene is preferably not less than 30, more preferably not less than 32, and further preferably not less than 35. The Mooney viscosity ($ML_{1+4}$(100° C.)) is preferably not greater than 140, more preferably not greater than 120, further preferably not greater than 100, and particularly preferably not greater than 80. The Mooney viscosity ($ML_{1+4}$(100° C.)) in the present invention means a value obtained through a measurement conducted according to JIS K6300 using an L rotor under conditions of a preheating time of 1 minute, a rotor rotating time of 4 minutes, and 100° C.

In light of workability, the molecular weight distribution Mw/Mn (Mw: weight average molecular weight, Mn: number average molecular weight) of the high-cis polybutadiene is preferably not less than 2.0, more preferably not less than 2.2, further preferably not less than 2.4, and particularly preferably not less than 2.6. In light of resilience performance, the molecular weight distribution Mw/Mn is preferably not greater than 6.0, more preferably not greater than 5.0, further preferably not greater than 4.0, and particularly preferably not greater than 3.4. The molecular weight distribution Mw/Mn is a value that is: obtained by conducting a measurement using gel permeation chromatography ("HLC-8120GPC", manufactured by Tosoh Corporation) under conditions where a differential refractometer is used as a detector, GMHHXL (manufactured by Tosoh Corporation) is used as a column, the column temperature is set at 40° C., and tetrahydrofuran is used as a mobile phase; and calculated through conversion using polystyrene standard.

The α,β-unsaturated carboxylic acid having 3 to 8 carbon atoms and/or the metal salt thereof included as the co-crosslinking agent (b) has action of crosslinking rubber molecules by graft-polymerizing with the molecular chain of the base rubber (a). When the rubber composition of the core 4 contains only the α,β-unsaturated carboxylic acid having 3 to 8 carbon atoms as the co-crosslinking agent (b), the rubber composition further contains a later-described metal compound (f) as an essential component. The metal compound (f) neutralizes the α,β-unsaturated carboxylic acid having 3 to 8 carbon atoms. The neutralized α,β-unsaturated carboxylic acid having 3 to 8 carbon atoms substantially acts in the same manner as a metal salt of the α,β-unsaturated carboxylic acid having 3 to 8 carbon atoms. When the α,β-unsaturated carboxylic acid having 3 to 8 carbon atoms and the metal salt thereof are used in combination as the co-crosslinking agent (b), the metal compound (f) may be used as an optional component.

Specific examples of the α,β-unsaturated carboxylic acid having 3 to 8 carbon atoms include acrylic acid, methacrylic acid, fumaric acid, maleic acid, crotonic acid, and the like. Acrylic acid and methacrylic acid, which have excellent reactivity with rubber molecules, are preferable.

Examples of the metal forming the metal salt of the α,β-unsaturated carboxylic acid having 3 to 8 carbon atoms include monovalent metal ions such as sodium, potassium, lithium, and the like; bivalent metal ions such as magnesium, calcium, zinc, barium, cadmium, and the like; trivalent metal ions such as aluminum and the like; and other ions such as tin, zirconium, and the like. These metal components may be used solely, or may be used as a mixture of two or more thereof. Among these metal components, more preferable metal components are bivalent metal ions such as magnesium, calcium, zinc, barium, cadmium, and the like. By using a bivalent metal salt of the α,β-unsaturated carboxylic acid having 3 to 8 carbon atoms, metal crosslinks easily occur between the rubber molecules. From the viewpoint that the core 4 having high resilience is obtained, a particularly preferable bivalent metal salt is zinc acrylate. The α,β-unsaturated carboxylic acid having 3 to 8 carbon atoms and/or the metal salt thereof may be used solely, or two or more types thereof may be used in combination.

The amount of the α,β-unsaturated carboxylic acid having 3 to 8 carbon atoms and/or the metal salt thereof included as the co-crosslinking agent (b), per 100 parts by weight of the base rubber (a), is preferably not less than 15 parts by weight. In the rubber composition including the co-crosslinking agent (b) in an amount of not less than 15 parts by weight, the core 4 having an appropriate hardness can be formed without increasing the amount of the later-described crosslinking initiator (c). The golf ball 2 including the core 4 has excellent resilience performance. From this viewpoint, the amount of the co-crosslinking agent (b) is more preferably not less than 20 parts by weight and further preferably not less than 25 parts by weight. In light of feel at impact, the amount of the co-crosslinking agent (b) is preferably not greater than 50 parts by weight, more preferably not greater than 45 parts by weight, and further preferably not greater than 35 parts by weight.

The crosslinking initiator (c) is included in order to crosslink the rubber molecules of the base rubber (a). A preferable crosslinking initiator (c) is an organic peroxide. Specific examples of the organic peroxide include dicumyl peroxide, 1,1-bis(t-butylperoxy)-3,3,5-trimethylcyclohexane, 2,5-dimethyl-2,5-di(t-butylperoxy)hexane, di-t-butyl peroxide, and the like. These organic peroxides may be used solely, or two or more of these organic peroxides may be used in combination. Dicumyl peroxide is preferable.

The amount of the crosslinking initiator (c) per 100 parts by weight of the base rubber (a) is preferably not less than 0.2 parts by weight. By the rubber composition including the crosslinking initiator (c) in an amount of not less than 0.2 parts by weight, the core 4 having an appropriate hardness is formed. The golf ball 2 including the core 4 has excellent resilience performance. From this viewpoint, the amount of the crosslinking initiator (c) is more preferably not less than 0.5 parts by weight and further preferably not less than 0.7 parts by weight. From the viewpoint that the core 4 having an appropriate hardness can be formed without decreasing the amount of the co-crosslinking agent (b), the amount of the crosslinking initiator (c) is preferably not greater than 5.0 parts by weight. When the amount of the crosslinking initiator (c) satisfies this numeric range, the durability and the resilience performance of the obtained golf ball 2 improve. From this viewpoint, the amount of the crosslinking initiator (c) is more preferably not greater than 2.5 parts by weight and further preferably not greater than 2.0 parts by weight.

In the specification of the present application, the unsaturated fatty acid and/or the metal salt thereof (d) is an aliphatic monocarboxylic acid having at least one unsaturated bond in a hydrocarbon chain, and/or a metal salt thereof. One or more hydrogen atoms included in the hydrocarbon chain may be substituted with substituents. As described above, the α,β-unsaturated carboxylic acid having 3 to 8 carbon atoms and/or the metal salt thereof included as the co-crosslinking agent (b) is not included in the unsaturated fatty acid and/or the metal salt (d).

The unsaturated fatty acid having an unsaturated bond in the hydrocarbon chain and/or the metal salt thereof (d) can undergo an addition reaction with the co-crosslinking agent (b). From the viewpoint that the addition reaction with the co-crosslinking agent (b) easily occurs and the core 4 having high resilience is obtained, the number of carbon atoms of the fatty acid component of the unsaturated fatty acid and/or the metal salt thereof (d) is preferably not greater than 33, more preferably not greater than 30, and particularly preferably not greater than 26. From the same viewpoint, the number of carbon atoms of the fatty acid component is preferably not less than 4, more preferably not less than 5, further preferably not less than 8, and particularly preferably not less than 12.

When the unsaturated fatty acid and/or the metal salt thereof (d) is an unsaturated fatty acid having 5 or more carbon atoms or a metal salt thereof, the unsaturated fatty acid or the metal salt thereof preferably has a first carbon-carbon double bond at the first carbon or subsequent carbon, more preferably at the second carbon or subsequent carbon, further preferably at the third carbon or subsequent carbon, and particularly preferably at the fourth carbon or subsequent carbon, counted from the carboxyl group side. In the rubber composition including the unsaturated fatty acid and/or the metal salt thereof (d), the addition reaction with the co-crosslinking agent (b) is prompted, and the core 4 having high resilience is obtained.

The unsaturated fatty acid and/or the metal salt thereof (d) is preferably represented by the following formula (1).

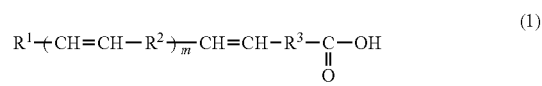

(1)

(In the formula (1), $R^1$ represents a hydrogen atom or an alkyl group having 1 to 25 carbon atoms and optionally having a substituent. $R^2$ represents an alkylene group having 1 to 25 carbon atoms and optionally having a substituent. $R^3$ represents an alkylene group having 2 to 25 carbon atoms and optionally having a substituent. "m" represents a natural number of 0 to 5. When "m" is 2 to 5, a plurality of $R^2$s may be the same or different from each other.)

When $R^1$ is an alkyl group in the above formula (1), the alkyl group $R^1$ may be linear or may have a branch structure or a cyclic structure. The linear alkyl group $R^1$ is preferable. The number of carbon atoms of the alkyl group $R^1$ is preferably not less than 1, more preferably not less than 3, and particularly preferably not less than 5. The number of carbon atoms of the alkyl group $R^1$ is preferably not greater than 25, more preferably not greater than 23, and particularly preferably not greater than 21. Examples of a functional group included in the alkyl group $R^1$ include a hydroxy group, an aldehyde group, a ketone group, and the like.

In the above formula (1), the alkylene group indicated by $R^2$ may be linear or may have a branch structure or a cyclic structure. The linear alkylene group $R^2$ is preferable. The number of carbon atoms of the alkylene group $R^2$ is preferably not less than 1, more preferably not less than 3, and particularly preferably not less than 5. The number of carbon atoms of the alkylene group $R^2$ is preferably not greater than 25, more preferably not greater than 23, and particularly preferably not greater than 21. Examples of a functional group included in the alkylene group $R^2$ include a hydroxy group, an aldehyde group, a ketone group, and the like.

In the above formula (1), the alkylene group indicated by $R^3$ may be linear or may have a branch structure or a cyclic structure. The linear alkylene group $R^3$ is preferable. The number of carbon atoms of the alkylene group $R^3$ is preferably not less than 2, more preferably not less than 3, and particularly preferably not less than 4. The number of carbon atoms of the alkylene group $R^3$ is preferably not greater than 25, more preferably not greater than 23, and particularly preferably not greater than 21. Examples of a functional group included in the alkylene group $R^3$ include a hydroxy group, an aldehyde group, a ketone group, and the like.

In the above formula (1), "m" is preferably not greater than 3, more preferably not greater than 2, further preferably not greater than 1, and particularly preferably 0.

Among the compounds represented by the above formula (1), a compound represented by the following formula (2) or (3) is more preferable.

(2)

(In the formula (2), $R^{11}$ represents a hydrogen atom or an alkyl group having 1 to 25 carbon atoms and optionally having a substituent. $R^{12}$ represents an alkylene group having 2 to 25 carbon atoms and optionally having a substituent).

When $R^{11}$ is an alkyl group in the above formula (2), the alkyl group $R^{11}$ may be linear or may have a branch structure or a cyclic structure. The linear alkyl group $R^{11}$ is preferable. Examples of a functional group included in the alkyl group $R^{11}$ include a hydroxy group, an aldehyde group, a ketone group, and the like.

In the above formula (2), the alkylene group indicated by $R^{12}$ may be linear or may have a branch structure or a cyclic structure. The linear alkylene group $R^{12}$ is preferable. Examples of a functional group included in the alkylene group $R^{12}$ include a hydroxy group, an aldehyde group, a ketone group, and the like.

When $R^{11}$ is an alkyl group in the above formula (2), the ratio ($R^{11}/R^{12}$) of the number of carbon atoms of the alkyl group $R^{11}$ to the number of carbon atoms of the alkylene group $R^{12}$ is preferably not less than 0.1, more preferably not less than 0.5, and particularly preferably not less than 0.8. The ratio ($R^{11}/R^{12}$) is preferably not greater than 10.0, more preferably not greater than 5.0, and particularly preferably not greater than 1.3. When the ratio ($R^{11}/R^{12}$) falls within the above range, the core 4 having high resilience is obtained.

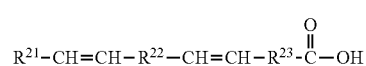

(3)

(In the formula (3), $R^{21}$ represents a hydrogen atom or an alkyl group having 1 to 25 carbon atoms and optionally having a substituent. $R^{22}$ represents an alkylene group having 1 to 25 carbon atoms and optionally having a substituent. $R^{23}$ represents an alkylene group having 2 to 25 carbon atoms and optionally having a substituent.)

When $R^{21}$ is an alkyl group in the above formula (3), the alkyl group $R^{21}$ may be linear or may have a branch structure or a cyclic structure. The linear alkyl group $R^{21}$ is preferable. Examples of a functional group included in the alkyl group $R^{21}$ include a hydroxy group, an aldehyde group, a ketone group, and the like.

In the above formula (3), the alkylene group indicated by $R^{22}$ may be linear or may have a branch structure or a cyclic structure. The linear alkylene group $R^{22}$ is preferable. Examples of a functional group included in the alkylene group $R^{22}$ include a hydroxy group, an aldehyde group, a ketone group, and the like. The number of carbon atoms of the alkylene group $R^{22}$ is preferably not greater than 25, more preferably not greater than 20, and particularly preferably not greater than 15. Preferable specific examples of the alkylene group $R^{22}$ include a methylene group and an ethylene group, and a methylene group is more preferable.

In the above formula (3), the alkylene group indicated by $R^{23}$ may be linear or may have a branch structure or a cyclic structure. The linear alkylene group $R^{23}$ is preferable. Examples of a functional group included in the alkylene group $R^{23}$ include a hydroxy group, an aldehyde group, a ketone group, and the like.

When $R^{21}$ is an alkyl group in the above formula (3), the ratio ($R^{21}/R^{23}$) of the number of carbon atoms of the alkyl group $R^{21}$ to the number of carbon atoms of the alkylene group $R^{23}$ is preferably not less than 0.1, more preferably not less than 0.5, and particularly preferably not less than 0.8. The ratio ($R^{21}/R^{23}$) is preferably not greater than 10.0, more preferably not greater than 5.0, and particularly preferably not greater than 1.3. When the ratio ($R^{21}/R^{23}$) falls within the above range, the addition reaction with the co-crosslinking agent (b) efficiently occurs, and thus the core 4 having high resilience is obtained.

The linear unsaturated fatty acid and/or the metal salt thereof (d) is preferable. Examples of the linear unsaturated fatty acid and/or the metal salt thereof (d) include an unsaturated fatty acid having a carbon-carbon double bond at an end of a hydrocarbon chain and/or a metal salt thereof, an unsaturated fatty acid having at least one trans carbon-carbon double bond and/or a metal salt thereof, and an unsaturated fatty acid having at least one cis carbon-carbon double bond and/or a metal salt thereof. From the viewpoint that the reactivity with the co-crosslinking agent (b) is high and the core 4 having high resilience is obtained, an unsaturated fatty acid having at least one cis carbon-carbon double bond and/or a metal salt thereof is more preferable.

Specific examples of the unsaturated fatty acid forming the unsaturated fatty acid and/or the metal salt thereof (d) include: unsaturated fatty acids having a double bond at an end such as 4-pentenoic acid (C5, monounsaturated fatty acid, (4)), 5-hexenoic acid (C6, monounsaturated fatty acid, (5)), 6-heptenoic acid (C7, monounsaturated fatty acid, (6)), 7-octenoic acid (C8, monounsaturated fatty acid, (7)), 8-nonenoic acid (C9, monounsaturated fatty acid, (8)), 9-decenoic acid (010, a monounsaturated fatty acid (9)), 10-undecylenic acid (C11, monounsaturated fatty acid, (10)), and the like; and unsaturated fatty acids having a double bond at a position other than the ends such as myristoleic acid (C14, cis-9-monounsaturated fatty acid, (9)), palmitoleic acid (C16, cis-9-monounsaturated fatty acid, (9)), stearidonic acid (C18, 6,9,12,15-tetraunsaturated fatty acid, (6)), vaccenic acid (C18, cis-11-monounsaturated fatty acid, (11)), oleic acid (C18, cis-9-monounsaturated fatty acid, (9)), ricinoleic acid (C18, 12-hydroxy-cis-9-monounsaturated fatty acid), elaidic acid (C18, trans-9-monounsaturated fatty acid, (9)), linolic acid (C18, cis-9-cis-12-diunsaturated fatty acid, (9)), α-linolenic acid (C18, 9,12,15-triunsaturated fatty acid, (9)), γ-linolenic acid (C18, 6,9,12-triunsaturated fatty acid, (6)), gadoleic acid (C20, cis-9-monounsaturated fatty acid, (9)), eicosenoic acid (C20, cis-11-monounsaturated fatty acid, (11)), eicosadienoic acid (C20, cis-11-cis-14-diunsaturated fatty acid, (11)), arachidic acid (C20, 5,8,11,14-tetraunsaturated fatty acid, (5)), eicosapentaenoic acid (C20, 5,8,11,14,17-pentaunsaturated fatty acid, (5)), erucic acid (C22, cis-13-monounsaturated fatty acid, (13)), docosahexaenoic acid (C22, 4,7,10,13,16,19-hexaunsaturated fatty acid, (4)), nervonic acid (C24, cis-15-monounsaturated fatty acid, (15)), and the like. It should be noted that (10) or the like in the parentheses added at each compound name indicates the position of a carbon having the first carbon-carbon double bond counted from the carboxyl group of the unsaturated fatty acid. Among these, 10-undecylenic acid, myristoleic acid, palmitoleic acid, oleic acid, linolic acid, eicosenoic acid, erucic acid, and nervonic acid are more preferable.

Examples of the metal component forming the unsaturated fatty acid metal salt (d) include monovalent metal ions such as sodium, potassium, lithium, and the like; bivalent metal ions such as magnesium, calcium, zinc, barium, cadmium, and the like; trivalent metal ions such as aluminum and the like; and other ions such as tin, zirconium, and the like. The unsaturated fatty acid metal salt (d) may include two or more metal components. In light of reactivity with the co-crosslinking agent (b), bivalent metal ions such as magnesium, calcium, zinc, barium, cadmium, and the like are preferable, and zinc is more preferable.

From the viewpoint that the core 4 having high resilience is obtained, the amount of the unsaturated fatty acid and/or the metal salt thereof (d) per 100 parts by weight of the base rubber (a) is preferably not less than 1.0 part by weight, more preferably not less than 2.0 parts by weight, and particularly preferably not less than 3.0 parts by weight. From the viewpoint that the core 4 is not excessively flexible and the durability and the resilience performance of the golf ball 2 are not impaired, this amount is preferably not greater than 35 parts by weight, more preferably not greater than 30 parts by weight, further preferably not greater than 25 parts by weight, particularly preferably not greater than 20 parts by weight, and most preferably not greater than 17 parts by weight.

The ratio [(d)/(b)] of the total number of moles of the carboxyl groups (—COOH) and the carboxylate groups (—COO—) included in the unsaturated fatty acid and/or the metal salt thereof (d) relative to the total number of moles of the carboxyl groups and the carboxylate groups included in the co-crosslinking agent (b) is preferably not less than 0.01, more preferably not less than 0.02, and further preferably not less than 0.03. The ratio [(d)/(b)] is preferably not greater than 0.25, more preferably not greater than 0.20, and further preferably not greater than 0.18.

A saturated fatty acid and/or a metal salt thereof (e) can be included in the rubber composition as necessary. By the saturated fatty acid and/or the metal salt thereof (e), the dispersibility of each component in the rubber composition is improved. The fatty acid component forming the saturated fatty acid and/or the metal salt thereof is not particularly limited, and may be either a linear saturated fatty acid or a saturated fatty acid having a branched chain. Two or more saturated fatty acids and/or metal salts thereof (e) may be used in combination.

The number of carbon atoms of the fatty acid component forming the saturated fatty acid and/or the metal salt thereof (e) is preferably not less than 4, more preferably not less than 12, and particularly preferably not less than 16. The number of carbon atoms of the fatty acid component is preferably not greater than 30, more preferably not greater than 28, and particularly preferably not greater than 26.

Specific examples of the saturated fatty acid include butanoic acid, pentanoic acid, hexanoic acid, heptanoic acid, octanoic acid, nonanoic acid, decanoic acid, undecanoic acid, dodecanoic acid, tridecanoic acid, tetradecanoic acid, pentadecanoic acid, hexadecanoic acid, heptadecanoic acid, octadecanoic acid, nonadecanoic acid, icosanoic acid, henicosanoic acid, docosanoic acid, tricosanoic acid, tetracosanoic acid, pentacosanoic acid, hexacosanoic acid, heptacosanoic acid, octacosanoic acid, nonacosanoic acid, triacontanoic acid, and the like. Two or more saturated fatty acids may be included in the rubber composition.

Examples of the metal component forming the saturated fatty acid metal salt include: monovalent metal ions such as sodium, potassium, lithium, silver, and the like; bivalent metal ions such as magnesium, calcium, zinc, barium, cadmium, copper, cobalt, nickel, manganese, and the like; trivalent metal ions such as aluminum, iron, and the like; and other ions such as tin, zirconium, titanium, and the like. The saturated fatty acid metal salt can include two or more metal components.

In light of improvement of the dispersibility of each component, the amount of the saturated fatty acid and/or the metal salt thereof (e) per 100 parts by weight of the base rubber (a) is preferably not less than 0.5 parts by weight, more preferably not less than 1.0 part by weight, and particularly preferably not less than 1.5 parts by weight. From the viewpoint that change of the physical property values of the rubber composition is suppressed, the amount of the saturated fatty acid and/or the metal salt thereof (e) is preferably not greater than 5.0 parts by weight, more preferably not greater than 4.5 parts by weight, and particularly preferably not greater than 3.5 parts by weight.

Examples of the metal compound (f) included together with the α,β-unsaturated carboxylic acid having 3 to 8 carbon atoms include: metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; and metal carbonates such as magnesium carbonate, zinc carbonate, calcium carbonate, sodium carbonate, lithium carbonate, potassium carbonate, and the like. A compound that reacts with the α,β-unsaturated carboxylic acid having 3 to 8 carbon atoms to form metal crosslinks and that includes a bivalent metal is preferable. In light of improvement of the resilience of the core 4, a more preferable metal compound (f) is a zinc compound. As necessary, two or more metal compounds (f) may be used in combination.

The amount of the metal compound (f) is adjusted as appropriate in accordance with the degree of neutralization N of the carboxyl groups in the rubber composition. From the viewpoint that the amount of compressive deformation of the core 4 is not changed and the durability of the golf ball 2 is maintained, the amount of the metal compound (f) is adjusted such that the degree of neutralization N is preferably not less than 100 mol %, more preferably not less than 105 mol %, further preferably not less than 108 mol %, and particularly preferably not less than 110 mol %. In addition, from the viewpoint that the obtained core 4 is not excessively flexible and the resilience performance of the golf ball 2 is not impaired, the amount of the metal compound (f) is adjusted such that the degree of neutralization N is preferably not greater than 300 mol %, more preferably not greater than 270 mol %, further preferably not greater than 250 mol %, and particularly preferably not greater than 200 mol %.

In the specification of the present application, conceptually, the carboxyl groups in the rubber composition are the carboxyl groups derived from the α,β-unsaturated carboxylic acid (b) having 3 to 8 carbon atoms and the unsaturated fatty acid (d), and include the carboxyl groups derived from the saturated fatty acid (e) when the rubber composition includes the saturated fatty acid (e). The degree of neutralization N of the carboxyl groups in the rubber composition is defined by the following formula.

$$N \text{ (mol \%)} = [\Sigma(Mc \times Vc) / \Sigma(Ma \times Va)] \times 100$$

(In the formula, Mc is the number of moles of a cationic component, Vc is the valence of the cationic component, Σ(Mc×Vc) is the sum of: the product of the number of moles of the metal ion of the (b) component and the valence of the metal ion; the product of the number of moles of the metal ion of the (d) component and the valence of the metal ion; and the product of the number of moles of the metal ion of the (f) component and the valence of the metal ion. When the rubber composition contains the (e) component, the product of the number of moles of the metal ion of the (e) component and the valence of the metal ion is added. Ma is the number of moles of an anionic component, Va is the valence of the anionic component, Σ(Ma×Va) is the sum of the number of moles of the carboxyl groups of the (b) component and the number of moles of the carboxyl groups of the (d) component. When the rubber composition contains the (e) component, the number of moles of the carboxyl groups of the (e) component is added.)

The rubber composition of the core 4 preferably includes an organic sulfur compound (g). The organic sulfur compound (g) contributes to improvement of the resilience of the core 4. The type of the organic sulfur compound (g) is not particularly limited as long as the organic sulfur compound (g) is an organic compound having a sulfur atom within the molecule. Examples of the organic sulfur compound (g) include organic compounds having a thiol group (—SH) or having a polysulfide bond (—S—S—, —S—S—S—, —S—S—S—S—) with 2 to 4 sulfur atoms, and metal salts thereof ( -SM, —S-M-S—, —S-M-S—S—, —S—S-M-S—S—, —S-M-S—S—S—, and the like, M is a metal atom). Examples of the metal salts include: monovalent metal salts of sodium, lithium, potassium, copper (I), and silver (I); bivalent metal salts of zinc, magnesium, calcium, strontium, barium, titanium (II), manganese (II), iron (II), cobalt (II), nickel (II), zirconium (II), and tin (II); and the like. The organic sulfur compound (g) may be any of an aliphatic compound (aliphatic thiol, aliphatic thiocarboxylic acid, aliphatic dithiocarboxylic acid, aliphatic polysulfide, and the like), a heterocyclic compound, an alicyclic compound (alicyclic thiol, alicyclic thiocarboxylic acid, alicyclic dithiocarboxylic acid, alicyclic polysulfide, and the like), and an aromatic compound.

Examples of a suitable organic sulfur compound (g) include thiols, polysulfides, thiurams, thiocarboxylic acids, dithiocarboxylic acids, sulfenamides, dithiocarbamates, thiazoles, and the like. Two or more organic sulfur compounds may be used in combination.

Examples of thiols include thiophenols and thionaphthols. Examples of thiophenols include: thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, 2,4,5,6-tetrafluorothiophenol, pentafluorothiophenol, and the like; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol, and the like; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, pentabromothiophenol, and the like; thiophenols substituted with an iodo group, such as 4-iodothiophenol, 2,4-diiodothiophenol, 2,5-diiodothiophenol, 2,6-diiodothiophenol, 2,4,5-triiodothiophenol, 2,4,5,6-tetraiodothiophenol, pentaiodothiophenol, and the like; and metal salts thereof. As metal salts, zinc salts are preferable.

Examples of thionaphthols (also referred to as naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and metal salts thereof. 2-thionaphthol, 1-thionaphthol, and metal salts thereof are preferable. As metal salts, bivalent metal salts are preferable, and zinc salts are more preferable. Specific examples of metal salts of thionaphthols include zinc salt of 1-thionaphthol and zinc salt of 2-thionaphthol.

Polysulfides are organic sulfur compounds having a polysulfide bond, and examples thereof include disulfides, trisulfides, tetrasulfides, and the like. Diphenyl polysulfides are preferable.

Examples of diphenyl polysulfides include: diphenyl disulfide; diphenyl disulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl) disulfide, bis(2,5-dichlorophenyl)disulfide, bis(2,6-dichlorophenyl)disulfide, bis(2,4,5-trichlorophenyl) disulfide, bis(2,4,5,6-tetrachlorophenyl)disulfide, bis (pentachlorophenyl)disulfide, bis(4-bromophenyl)disulfide, bis(2,5-dibromophenyl)disulfide, bis(2,6-dibromophenyl) disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl) disulfide, bis(2,6-diiodophenyl)disulfide, bis(2,4,5-triiodophenyl)disulfide, bis(2,4,5,6-tetraiodophenyl) disulfide, bis(pentaiodophenyl)disulfide, and the like; diphenyl disulfides substituted with an alkyl group, such as bis(4-methylphenyl)disulfide, bis(2,4,5-trimethylphenyl) disulfide, bis(pentamethylphenyl)disulfide, bis(4-t-butylphenyl)disulfide, bis(2,4,5-tri-t-butylphenyl)disulfide, bis (penta-t-butylphenyl)disulfide, and the like; and the like.

Examples of thiurams include thiuram monosulfides such as tetramethylthiuram monosulfide and the like, thiuram disulfides such as tetramethylthiuram disulfide, tetraethylthiuram disulfide, tetrabutylthiuram disulfide, and the like, and thiuram tetrasulfides such as dipentamethylenethiuram tetrasulfide and the like. Examples of thiocarboxylic acids include naphthalenethiocarboxylic acid. Examples of dithiocarboxylic acids include naphthalenedithiocarboxylic acid. Examples of sulfenamides include N-cyclohexyl-2-benzothiazole sulfenamide, N-oxydiethylene-2-benzothiazole sulfenamide, N-t-butyl-2-benzothiazole sulfenamide, and the like.

Preferable organic sulfur compounds (g) are thiophenols and/or metal salts thereof, thionaphthols and/or metal salts thereof, diphenyl disulfides, and thiuram disulfides. 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl)disulfide are more preferable.

In light of resilience performance of the golf ball 2, the amount of the organic sulfur compound (g) per 100 parts by weight of the base rubber (a) is preferably not less than 0.05 parts by weight, more preferably not less than 0.1 parts by weight, and particularly preferably not less than 0.2 parts by weight. This amount is preferably not greater than 5.0 parts by weight, more preferably not greater than 3.0 parts by weight, and particularly preferably not greater than 2.0 parts by weight. When two or more organic sulfur compounds (g) are used in combination, the total amount thereof is regarded as the amount of the organic sulfur compound (g).

Within a range in which the object of the present invention is achieved, it is possible to include a filler, a coloring agent, an anti-aging agent, a peptizer, a softener, crosslinked rubber powder, and synthetic resin powder in an adequate amount in the rubber composition of the core 4. The filler is added mainly for adjusting the specific gravity of the core 4. Examples of suitable fillers include zinc oxide, barium sulfate, calcium carbonate, magnesium oxide, tungsten powder, molybdenum powder, and the like.

Examples of suitable coloring agents include white pigments, blue pigments, purple pigments, and the like. A typical white pigment is titanium dioxide, and a rutile type, which has a high hiding property, is preferable. When titanium dioxide is used as a white pigment, the amount thereof per 100 parts by weight of the base rubber (a) is preferably not less than 0.5 parts by weight and not greater than 8.0 parts by weight. By using a blue pigment in combination with a white pigment, a more vivid white color is obtained. Examples of blue pigments include ultramarine, cobalt blue, phthalocyanine blue, and the like. The amount of the blue pigment per 100 parts by weight of the base rubber (a) is preferably not less than 0.001 parts by weight and not greater than 0.2 parts by weight. Examples of purple pigments include anthraquinone violet, dioxazine violet, methyl violet, and the like.

The amount of the anti-aging agent per 100 parts by weight of the base rubber (a) is preferably not less than 0.1 parts by weight and not greater than 1.0 part by weight. The amount of the peptizer per 100 parts by weight of the base rubber (a) is preferably not less than 0.1 parts by weight and not greater than 5.0 parts by weight.

The spherical core 4 is obtained by pressurizing and heating the rubber composition, obtained by blending each component, within a mold. From the viewpoint that an appropriate hardness distribution is formed in the core 4, the heating temperature is preferably 150° C.±10° C. and more preferably 150° C.±5° C. The heating time is preferably not shorter than 10 minutes and not longer than 60 minutes. The rubber composition is preferably heated under a pressure of not less than 2.9 MPa and not greater than 11.8 MPa.

Preferably, the spherical core 4 includes a compound having a structure represented by the following formula (4). The core 4 including the compound has high resilience. The carboxyl groups included in the following formula (4) may be neutralized with metal ions. The carboxyl groups may form metal crosslinks with another compound.

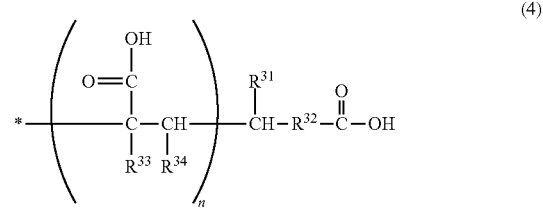

(4)

(In the formula (4), $R^{31}$ represents a hydrogen atom or an optionally substituted alkyl group having 1 to 25 carbon atoms. $R^{32}$ represents an optionally substituted alkylene group having 2 to 25 carbon atoms. $R^{33}$ represents a hydrogen atom or an alkyl group having 1 to 5 carbon atoms. $R^{34}$ represents a hydrogen atom, a carboxyl group, or an alkyl group having 1 to 5 carbon atoms. "*" represents a position bonded to a carbon atom in the base rubber (a). "n" represents a natural number not less than 1. When "n" is not less than 2, a plurality of $R^{33}$s and a plurality of $R^{34}$s may be the same or different from each other.)

When $R^{31}$ is an alkyl group in the above formula (4), the alkyl group $R^{31}$ may be linear or may have a branch structure or a cyclic structure. The linear alkyl group $R^{31}$ is preferable. Examples of a functional group included in the alkyl group $R^{31}$ include a hydroxy group, an aldehyde group, a ketone group, and the like. The number of carbon atoms of the alkyl group $R^{31}$ is preferably not less than 1, more preferably not less than 3, and particularly preferably not less than 5. The number of carbon atoms of the alkyl group $R^{31}$ is preferably not greater than 25, more preferably not greater than 23, and particularly preferably not greater than 21.

In the above formula (4), the alkylene group represented by $R^{32}$ may be linear or may have a branch structure or a cyclic structure. The linear alkyl group $R^{32}$ is preferable. Examples of a functional group included in the alkylene group $R^{32}$ include a hydroxy group, an aldehyde group, a ketone group, and the like. The number of carbon atoms of the alkylene group $R^{32}$ is preferably not less than 2, more preferably not less than 4, and particularly preferably not less than 5. The number of carbon atoms of the alkylene group $R^{32}$ is preferably not greater than 25, more preferably not greater than 23, and particularly preferably not greater than 21.

When $R^{33}$ is an alkyl group in the above formula (4), the alkyl group $R^{33}$ may be linear or may have a branch structure or a cyclic structure. The linear alkyl group $R^{33}$ is preferable. The number of carbon atoms of the alkyl group $R^{33}$ is preferably not less than 1, more preferably not less than 2, and particularly preferably not less than 3. The number of carbon atoms of the alkyl group $R^{33}$ is preferably not greater than 5 and more preferably not greater than 4.

When $R^{34}$ is an alkyl group in the above formula (4), the alkyl group $R^{34}$ may be linear or may have a branch structure or a cyclic structure. The linear alkyl group $R^{34}$ is preferable. The number of carbon atoms of the alkyl group $R^{34}$ is preferably not less than 1, more preferably not less than 2, and particularly preferably not less than 3. The number of carbon atoms of the alkyl group $R^{34}$ is preferably not greater than 5 and more preferably not greater than 4.

When $R^{33}$ and $R^{34}$ are each an alkyl group in the above formula (4), the sum of the number of carbon atoms of the alkyl group $R^{33}$ and the number of carbon atoms of the alkyl group $R^{34}$ is preferably not greater than 5, more preferably not greater than 4, and particularly preferably not greater than 3.

When $R^{31}$ is an alkyl group in the above formula (4), the sum of the number of carbon atoms of the alkyl group $R^{31}$ and the number of carbon atoms of the alkylene group $R^{32}$ is preferably not less than 8, more preferably not less than 10, and particularly preferably not less than 12. This sum is preferably not greater than 28, more preferably not greater than 26, and particularly preferably not greater than 24. When the sum of the number of carbon atoms of the alkyl group $R^{31}$ and the number of carbon atoms of the alkylene group $R^{32}$ falls within the above range, the core 4 having high resilience is obtained.

When $R^{31}$ is an alkyl group in the above formula (4), the ratio ($R^{31}/R^{32}$) of the number of carbon atoms of the alkyl group $R^{31}$ to the number of carbon atoms of the alkylene group $R^{32}$ is preferably not less than 0.1, more preferably not less than 0.5, and particularly preferably not less than 0.8. The ratio ($R^{31}/R^{32}$) is preferably not greater than 10.0, more preferably not greater than 5.0, and particularly preferably not greater than 1.3. When the ratio ($R^{31}/R^{32}$) falls within the above range, the core 4 having high resilience is obtained.

The mid layer 6 is formed from a thermoplastic resin composition. Examples of the base resin of the resin composition include ionomer resins, thermoplastic polyester elastomers, thermoplastic polyamide elastomers, thermoplastic polyurethane elastomers, thermoplastic polyolefin elastomers, and thermoplastic polystyrene elastomers. More preferable base resins are ionomer resins. Ionomer resins are highly elastic. The mid layer 6 formed from the resin composition including an ionomer resin contributes to the resilience performance of the golf ball 2. When the golf ball 2 including the mid layer 6 is hit with a driver, the flight distance is large.

An ionomer resin and another resin may be used in combination. In this case, in light of resilience performance, the ionomer resin is included as the principal component of the base resin. The proportion of the ionomer resin to the entire base resin is preferably not less than 50% by weight, more preferably not less than 70% by weight, and particularly preferably not less than 85% by weight.

Examples of preferable ionomer resins include binary copolymers formed with an α-olefin and an α,β-unsaturated carboxylic acid having 3 to 8 carbon atoms. A preferable binary copolymer includes 80% by weight or more but 90% by weight or less of an α-olefin, and 10% by weight or more but 20% by weight or less of an α,β-unsaturated carboxylic acid. The binary copolymer has excellent resilience performance. Examples of other preferable ionomer resins include ternary copolymers formed with: an α-olefin; an α,β-unsaturated carboxylic acid having 3 to 8 carbon atoms; and an α,β-unsaturated carboxylate ester having 2 to 22 carbon atoms. A preferable ternary copolymer includes 70% by weight or more but 85% by weight or less of an α-olefin, 5% by weight or more but 30% by weight or less of an α,β-unsaturated carboxylic acid, and 1% by weight or more but 25% by weight or less of an α,β-unsaturated carboxylate ester. The ternary copolymer has excellent resilience performance. The binary copolymer and the ternary copolymer may be mixed and used.

The α-olefins in the binary copolymer and the ternary copolymer are preferably olefins having 2 to 8 carbon atoms, and examples thereof include ethylene, propylene, butene, pentene, hexene, heptene, octene, and the like. Ethylene and propylene are preferable. Examples of the α,β-unsaturated carboxylic acid having 3 to 8 carbon atoms include acrylic acid, methacrylic acid, fumaric acid, maleic acid, crotonic acid, and the like. Acrylic acid and methacrylic acid are preferable. Examples of the α,β-unsaturated carboxylate ester having 2 to 22 carbon atoms include methyl, ethyl, propyl, n-butyl, and isobutyl esters of acrylic acid, methacrylic acid, fumaric acid, maleic acid, and the like. Acrylic acid esters and methacrylic acid esters are preferable.

At least some of the carboxyl groups included in the binary copolymer and the ternary copolymer are neutralized with metal ions. Examples of metal ions for use in neutralization include sodium ion, potassium ion, lithium ion, zinc ion, calcium ion, magnesium ion, aluminum ion, and neodymium ion. The neutralization may be carried out with two or more types of metal ions. Particularly suitable metal ions in light of resilience performance and durability of the golf ball 2 are sodium ion, zinc ion, lithium ion, and magnesium ion.

In light of resilience performance, a particularly preferable ionomer resin is a metal ion-neutralized product of an ethylene-(meth)acrylic acid binary copolymer, a metal ion-neutralized product of an ethylene-(meth)acrylic acid-(meth)acrylic acid ester ternary copolymer, or a mixture thereof.

Specific examples of ionomer resins include trade names "Himilan 1555", "Himilan 1557", "Himilan 1605", "Himilan 1706", "Himilan 1707", "Himilan 1856", "Himilan 1855", "Himilan AM7311", "Himilan AM7315", "Himilan AM7317", "Himilan AM7329", and "Himilan AM7337", manufactured by Du Pont-MITSUI POLYCHEMICALS Co., Ltd.; trade names "Surlyn 6120", "Surlyn 6910", "Surlyn 7930", "Surlyn 7940", "Surlyn 8140", "Surlyn 8150", "Surlyn 8940", "Surlyn 8945", "Surlyn 9120", "Surlyn 9150", "Surlyn 9910", "Surlyn 9945", "Surlyn AD8546", "HPF1000", and "HPF2000", manufactured by E.I. du Pont de Nemours and Company; and trade names "IOTEK 7010", "IOTEK 7030", "IOTEK 7510", "IOTEK 7520", "IOTEK 8000", and "IOTEK 8030", manufactured by ExxonMobil Chemical Corporation. Two or more ionomer resins may be used in combination.

The resin composition of the mid layer 6 may include a styrene block-containing thermoplastic elastomer. The styrene block-containing thermoplastic elastomer includes a polystyrene block as a hard segment, and a soft segment. A typical soft segment is a diene block. Examples of compounds for the diene block include butadiene, isoprene, 1,3-pentadiene, and 2,3-dimethyl-1,3-butadiene. Butadiene and isoprene are preferable. Two or more compounds may be used in combination.

Examples of styrene block-containing thermoplastic elastomers include styrene-butadiene-styrene block copolymers (SBS), styrene-isoprene-styrene block copolymers (SIS), styrene-isoprene-butadiene-styrene block copolymers (SIBS), hydrogenated SBS, hydrogenated SIS, and hydrogenated SIBS. Examples of hydrogenated SBS include styrene-ethylene-butylene-styrene block copolymers (SEBS). Examples of hydrogenated SIS include styrene-ethylene-propylene-styrene block copolymers (SEPS). Examples of hydrogenated SIBS include styrene-ethylene-ethylene-propylene-styrene block copolymers (SEEPS).

In light of resilience performance of the golf ball 2, the content of the styrene component in the styrene block-containing thermoplastic elastomer is preferably not less than 10% by weight, more preferably not less than 12% by weight, and particularly preferably not less than 15% by weight. In light of feel at impact upon a shot with a driver, the content is preferably not greater than 50% by weight, more preferably not greater than 47% by weight, and particularly preferably not greater than 45% by weight.

In the present invention, styrene block-containing thermoplastic elastomers include an alloy of an olefin and one or more members selected from the group consisting of SBS, SIS, SIBS, SEBS, SEPS, and SEEPS. The olefin component in the alloy is presumed to contribute to improvement of compatibility with another base resin. The alloy can contribute to the resilience performance of the golf ball 2. An olefin having 2 to 10 carbon atoms is preferable. Examples of suitable olefins include ethylene, propylene, butene, and pentene. Ethylene and propylene are particularly preferable.

Specific examples of polymer alloys include trade names "RABALON T3221C", "RABALON T3339C", "RABALON SJ4400N", "RABALON SJ5400N", "RABALON SJ6400N", "RABALON SJ7400N", "RABALON SJ8400N", "RABALON SJ9400N", and "RABALON SR04", manufactured by Mitsubishi Chemical Corporation. Other specific examples of styrene block-containing thermoplastic elastomers include trade name "Epofriend A1010" manufactured by Daicel Chemical Industries, Ltd., and trade name "SEPTON HG-252" manufactured by Kuraray Co., Ltd.

In light of feel at impact upon a shot with a driver, the proportion of the styrene block-containing thermoplastic elastomer to the entire base resin is preferably not less than 3% by weight and particularly preferably not less than 5% by weight. In light of spin suppression upon a shot with a driver, the proportion is preferably not greater than 30% by weight, more preferably not greater than 27% by weight, and particularly preferably not greater than 25% by weight.

The resin composition of the mid layer 6 may include a filler such as zinc oxide, barium sulfate, calcium carbonate, magnesium carbonate, and the like. The resin composition may include powder of a metal with a high specific gravity, such as tungsten, molybdenum, and the like, as the filler. The amount of the filler is determined as appropriate such that the intended specific gravity of the mid layer 6 is accomplished. The resin composition may further include a coloring agent such as titanium dioxide and the like, cross-linked rubber powder, or synthetic resin powder.

For forming the mid layer 6, known methods such as injection molding, compression molding, and the like can be used.

A resin composition is suitably used for the cover 8. The base resin of the resin composition of the cover 8 is preferably a urethane resin or a urea resin. A urethane resin is more preferable. The principal component of a urethane resin is a polyurethane. The polyurethane is flexible. The cover 8 formed from the resin composition including the polyurethane contributes to controllability upon an approach shot. When the golf ball 2 including the cover 8 is hit with a short iron, a high spin rate is obtained. The polyurethane also contributes to the scuff resistance of the cover 8. The polyurethane can also contribute to excellent feel at impact upon hitting with a putter or a short iron.

A more preferable base resin of the resin composition of the cover 8 is a thermoplastic polyurethane elastomer. The thermoplastic polyurethane elastomer includes a polyurethane component as a hard segment and a polyester component or a polyether component as a soft segment. Examples of isocyanates for the polyurethane component include alicyclic diisocyanates, aromatic diisocyanates, and aliphatic diisocyanates. Two or more diisocyanates may be used in combination.

Examples of alicyclic diisocyanates include 4,4'-dicyclohexylmethane diisocyanate ($H_{12}MDI$), 1,3-bis(isocyanatomethyl)cyclohexane ($H_6XDI$), isophorone diisocyanate (IPDI), and trans-1,4-cyclohexane diisocyanate (CHDI). In light of versatility and processability, $H_{12}MDI$ is preferable.

Examples of aromatic diisocyanates include 4,4'-diphenylmethane diisocyanate (MDI) and toluene diisocyanate (TDI). Examples of aliphatic diisocyanates include hexamethylene diisocyanate (HDI).

Alicyclic diisocyanates are particularly preferable. Since an alicyclic diisocyanate does not have any double bond in the main chain, the alicyclic diisocyanate suppresses yellowing of the cover 8. In addition, since an alicyclic diisocyanate has excellent strength, the alicyclic diisocyanate suppresses damage of the cover 8.

Specific examples of thermoplastic polyurethane elastomers include trade names "Elastollan NY80A", "Elastollan NY82A", "Elastollan NY84A", "Elastollan NY85A", "Elastollan NY88A", "Elastollan NY90A", "Elastollan NY97A", "Elastollan NY585", "Elastollan XKP016N", "Elastollan 1195ATR", "Elastollan ET890A", and "Elastollan ET88050", manufactured by BASF Japan Ltd.; and trade names "RESAMINE P4585LS" and "RESAMINE PS62490", manufactured by Dainichiseika Color & Chemicals Mfg. Co., Ltd. From the viewpoint that a low hardness of the cover 8 can be achieved, "Elastollan NY80A", "Elastollan NY82A", "Elastollan NY84A", "Elastollan NY85A", "Elastollan NY90A", and "Elastollan NY97A" are particularly preferable.

A thermoplastic polyurethane elastomer and another resin may be used in combination. Examples of the resin that can be used in combination include thermoplastic polyester elastomers, thermoplastic polyamide elastomers, thermoplastic polyolefin elastomers, styrene block-containing thermoplastic elastomers, and ionomer resins. When a thermoplastic polyurethane elastomer and another resin are used in combination, the thermoplastic polyurethane elastomer is included as the principal component of the base resin, in light of spin performance and scuff resistance. The proportion of the thermoplastic polyurethane elastomer to the entire base resin is preferably not less than 50% by weight, more preferably not less than 70% by weight, and particularly preferably not less than 85% by weight.

As necessary, a pigment component such as a white pigment (for example, titanium dioxide), a blue pigment, a red pigment, and the like, a weight adjusting agent such as zinc oxide, calcium carbonate, barium sulfate, and the like, a dispersant, an anti-aging agent, an ultraviolet absorber, a light stabilizer, a fluorescent material, a fluorescent brightener, and the like can be included in an adequate amount in the cover 8.

For forming the cover 8, known methods such as injection molding, compression molding, and the like can be used.

When forming the cover 8, the dimples 10 are formed by pimples formed on the cavity face of a mold.

The golf ball 2 may include a reinforcing layer between the mid layer 6 and the cover 8. The reinforcing layer firmly adheres to the mid layer 6 and also to the cover 8. The reinforcing layer suppresses separation of the cover 8 from the mid layer 6. The reinforcing layer is formed from a resin composition. Examples of a preferable base resin of the resin composition include two-component curing type epoxy resins and two-component curing type urethane resins.

EXAMPLES

Example 1

A rubber composition was obtained by kneading 100 parts by weight of a high-cis polybutadiene (trade name "BR-730", manufactured by JSR Corporation), 33 parts by weight of zinc diacrylate (trade name "ZN-DA90S", manufactured by NISSHOKU TECHNO FINE CHEMICAL CO., LTD), 5.4 parts by weight of zinc oxide (trade name "Ginrei R", manufactured by Toho Zinc Co., Ltd.), 0.30 parts by weight of bis(pentabromophenyl)disulfide (manufactured by Kawaguchi Chemical Industry Co., Ltd.), 0.8 parts by weight of dicumyl peroxide (manufactured by Tokyo Chemical Industry Co., Ltd.), an appropriate amount of barium sulfate (manufactured by Sakai Chemical Industry Co., Ltd.), and 3.0 parts by weight of oleic acid (manufactured by Tokyo Chemical Industry Co., Ltd.). This rubber composition was placed into a mold including upper and lower mold halves each having a hemispherical cavity, and heated at 150° C. for 20 minutes to obtain a core S2 with a diameter of 39.7 mm. The amount of barium sulfate was adjusted such that a golf ball having a predetermined weight was obtained. The hardness distribution of the core S2 is shown in Table 1.

A resin composition M1 for a mid layer was obtained by kneading 47 parts by weight of an ionomer resin (trade name "Himilan 1605", manufactured by Du Pont-MITSUI POLYCHEMICALS Co., Ltd.), 50 parts by weight of another ionomer resin (trade name "Himilan AM7329", manufactured by Du Pont-MITSUI POLYCHEMICALS Co., Ltd.), 3 parts by weight of a styrene block-containing thermoplastic elastomer (trade name "RABALON T3221C", manufactured by Mitsubishi Chemical Corporation), and 3 parts by weight of titanium dioxide with a twin-screw kneading extruder. The extruding conditions were set as a screw diameter of 45 mm, a screw rotational speed of 200 rpm, screw L/D=35, and the kneaded material was heated to 160 to 230° C. at the position of a die of the extruder. The core S2 was covered with the obtained resin composition M1 by injection molding to form a mid layer with a thickness of 1.0 mm. The Shore D hardness and the Shore C hardness of the mid layer are shown in Table 5.

A paint composition ("POLIN 750LE", manufactured by SHINTO PAINT CO., LTD.) including a two-component curing type epoxy resin as a base resin was prepared. The base material liquid of this paint composition includes 30 parts by weight of a bisphenol A type epoxy resin and 70 parts by weight of a solvent. The curing agent liquid of this paint composition includes 40 parts by weight of a modified polyamide amine, 55 parts by weight of a solvent, and 5 parts by weight of titanium dioxide. The weight ratio of the base material liquid to the curing agent liquid is 1/1. This paint composition was applied to the surface of the mid layer with a spray gun, and kept at 23° C. for 12 hours to form a reinforcing layer with a thickness of 10 μm.

A resin composition C1 for a cover was obtained by kneading 100 parts by weight of a thermoplastic polyurethane elastomer ("Elastollan NY80A", manufactured by BASF Japan Ltd.), 0.2 parts by weight of a hindered amine light stabilizer (trade name "Tinuvin 770", manufactured by BASF Japan Ltd.), 4 parts by weight of titanium dioxide, and 0.04 parts by weight of ultramarine blue with a twin-screw kneading extruder under the above extruding conditions. The sphere consisting of the core, the mid layer, and the reinforcing layer was placed into a final mold including upper and lower mold halves each having a hemispherical cavity and having a large number of pimples on its cavity face. The reinforcing layer was covered with the resin composition C1 by injection molding to form a cover with a thickness of 0.5 mm. Dimples having a shape that is the inverted shape of the pimples were formed on the cover. A clear paint including a two-component curing type polyurethane as a base material was applied to this cover to obtain a golf ball of Example 1 with a diameter of about 42.7 mm and a weight of about 45.6 g. The Shore D hardness of the cover is shown in Table 6. Each hardness difference calculated for the golf ball of Example 1 is shown in Table 7.

Examples 2 to 17 and Comparative Examples 1 to 7

Golf balls of Examples 2 to 17 and Comparative Examples 1 to 7 were obtained in the same manner as Example 1, except the specifications of the core, the mid layer, and the cover were as shown in Tables 7 to 12 below. The composition and the hardness of the core are shown in detail in Tables 1 to 4 below. The composition and the hardness of the mid layer are shown in Table 5 below. The composition and the hardness of the cover are shown in Table 6 below.

[Flight Performance: Hit with Driver (W#1)]

A driver with a metal head (trade name "SRIXON Z-TX", manufactured by DUNLOP SPORTS CO. LTD., shaft hardness: X, loft angle: 8.5°) was attached to a swing robot M/C manufactured by Golf Laboratories, Inc., and a golf ball was hit at a head speed of 50 m/s. The flight distance (yard) from the launch point to the stop point, and the ball speed (m/s) and the spin rate (rpm) immediately after the hit were measured. The average value of data obtained by 12 measurements for each golf ball was regarded as a measured value for the golf ball. The ball speed, the spin rate, and the flight distance obtained as described above are shown in Tables 7 to 12 below.

[Approach Performance: Hit with Sand Wedge (SW)]

A sand wedge (trade name "XXIO", manufactured by DUNLOP SPORTS CO. LTD., shaft hardness: R, loft angle: 56°) was attached to a swing robot M/C manufactured by Golf Laboratories, Inc., a golf ball was hit at a head speed of 21 m/s, and the spin rate (rpm) immediately after the hit was measured. The average value of data obtained by 12 measurements for each golf ball is shown in Tables 7 to 12 below.

TABLE 1

Composition and Hardness Distribution of Core

| Type | S1 | S2 | S3 | S4 |
|---|---|---|---|---|
| Composition (phr) | | | | |
| BR730 | 100 | 100 | 100 | 100 |
| ZN-DA90S | 32 | 33 | 33 | 36 |
| Zinc oxide | 5.0 | 5.4 | 5.8 | 6.8 |
| PBDS | 0.30 | 0.30 | 0.30 | 0.30 |
| Dicumyl peroxide | 0.8 | 0.8 | 0.8 | 0.8 |
| Barium sulfate | * | * | * | * |
| Oleic acid (C18) | — | 3.0 | 5.0 | 10.0 |
| (d)/(b) | 0.00 | 0.04 | 0.07 | 0.13 |
| Hardness distribution (Shore C) | | | | |
| H0 (central point) | 56.4 | 54.4 | 54.9 | 55.9 |
| H12.5 | 64.2 | 61.7 | 62.2 | 63.2 |
| H25.0 | 67.6 | 65.8 | 66.3 | 67.3 |
| H37.5 | 68.5 | 66.4 | 67.4 | 67.9 |
| H50.0 | 68.8 | 67.4 | 67.9 | 67.4 |
| H62.5 | 72.2 | 73.4 | 71.9 | 70.4 |
| H75.0 | 77.6 | 77.7 | 76.7 | 73.7 |
| Hs (surface) | 84.2 | 82.0 | 80.0 | 75.0 |

* Appropriate amount

TABLE 2

Composition and Hardness Distribution of Core

| Type | S5 | S6 | S7 | S8 | S9 |
|---|---|---|---|---|---|
| Composition (phr) | | | | | |
| BR730 | 100 | 100 | 100 | 100 | 100 |
| ZN-DA90S | 33 | 33 | 33 | 33 | 33 |
| Zinc oxide | 4.8 | 5.5 | 5.5 | 5.9 | 6.5 |
| PBDS | 0.63 | 0.63 | 0.63 | 0.63 | 0.63 |
| Dicumyl peroxide | 0.8 | 0.8 | 0.8 | 0.8 | 0.8 |
| Barium sulfate | * | * | * | * | * |
| Zinc oleate (C18) | 5.6 | — | — | — | — |
| Erucic acid (C22) | — | 6.0 | — | — | — |
| Myristoleic acid (C14) | — | — | 4.0 | — | — |
| Undecylenic acid (C11) | — | — | — | 3.3 | — |
| Zinc ricinoleate (C18) | — | — | — | — | 5.8 |
| (d)/(b) | 0.07 | 0.07 | 0.07 | 0.07 | 0.07 |
| Hardness distribution (Shore C) | | | | | |
| H0 (central point) | 53.9 | 55.7 | 55.9 | 53.9 | 54.7 |
| H12.5 | 61.2 | 62.7 | 61.7 | 61.7 | 62.0 |
| H25.0 | 66.2 | 66.8 | 65.8 | 65.8 | 66.0 |
| H37.5 | 68.4 | 67.7 | 67.5 | 67.1 | 67.3 |
| H50.0 | 68.9 | 68.1 | 68.7 | 67.4 | 67.5 |
| H62.5 | 72.0 | 71.6 | 72.9 | 71.4 | 71.2 |
| H75.0 | 77.2 | 75.9 | 76.8 | 76.7 | 76.6 |
| Hs (surface) | 80.5 | 79.0 | 80.8 | 80.5 | 80.1 |

* Appropriate amount

TABLE 3

Composition and Hardness Distribution of Core

| Type | S10 | S11 | S12 | S13 |
|---|---|---|---|---|
| Composition (phr) | | | | |
| BR730 | 100 | 100 | 100 | 100 |
| ZN-DA90S | 33 | 33 | 33 | 33 |
| Zinc oxide | 5.5 | 6.4 | 4.8 | 5.0 |
| PBDS | 0.63 | 0.63 | 0.63 | 0.63 |
| Dicumyl peroxide | 0.8 | 0.8 | 0.8 | 0.8 |
| Barium sulfate | * | * | * | * |
| Stearic acid (C18) | 5.0 | 10.1 | — | — |
| Zinc stearate (C18) | — | — | 5.6 | 11.2 |
| (d)/(b) | 0.00 | 0.00 | 0.00 | 0.00 |
| Hardness distribution (Shore C) | | | | |
| H0 (central point) | 53.5 | 52.2 | 53.4 | 56.4 |
| H12.5 | 61.4 | 59.9 | 61.6 | 62.7 |
| H25.0 | 65.5 | 64.5 | 65.4 | 67.6 |
| H37.5 | 66.3 | 65.8 | 66.0 | 69.0 |
| H50.0 | 67.6 | 67.1 | 67.2 | 70.5 |
| H62.5 | 72.1 | 71.6 | 71.4 | 74.0 |
| H75.0 | 77.5 | 77.6 | 76.8 | 76.5 |
| Hs (surface) | 85.0 | 85.6 | 84.4 | 84.5 |

* Appropriate amount

TABLE 4

Composition and Hardness Distribution of Core

| Type | S14 | S15 | S16 | S17 |
|---|---|---|---|---|
| Composition (phr) | | | | |
| BR730 | 100 | 100 | 100 | 100 |
| ZN-DA90S | 33 | 33 | 33 | 33 |
| Zinc oxide | 6.1 | 6.8 | 6.6 | 6.0 |
| PBDS | 0.63 | 0.63 | 0.63 | 0.63 |
| Dicumyl peroxide | 0.8 | 0.8 | 0.8 | 0.8 |
| Barium sulfate | * | * | * | * |
| Erucic acid (C22) | — | — | — | 12.0 |
| Myristoleic acid (C14) | 8.0 | — | 12.0 | — |
| Undecylenic acid (C11) | — | 6.6 | — | — |
| (d)/(b) | 0.15 | 0.15 | 0.21 | 0.15 |
| Hardness distribution (Shore C) | | | | |
| H0 (central point) | 56.4 | 55.3 | 55.8 | 56.8 |
| H12.5 | 59.2 | 60.4 | 59.0 | 61.4 |
| H25.0 | 63.2 | 64.9 | 63.8 | 65.9 |
| H37.5 | 65.8 | 66.8 | 66.9 | 67.2 |
| H50.0 | 66.1 | 66.9 | 68.8 | 68.2 |
| H62.5 | 73.1 | 71.6 | 73.8 | 72.4 |
| H75.0 | 77.4 | 74.8 | 78.2 | 73.8 |
| Hs (surface) | 80.6 | 81.2 | 80.4 | 77.6 |

* Appropriate amount

The details of the compounds listed in Tables 1 to 4 are as follows.

BR-730: a high-cis polybutadiene rubber manufactured by JSR Corporation (cis-1,4-bond content=96% by weight, 1,2-vinyl bond content=1.3% by weight, Mooney viscosity ($ML_{1+4}$(100° C.))=55, molecular weight distribution (Mw/Mn)=3)

ZN-DA90S: zinc diacrylate manufactured by NISSHOKU TECHNO FINE CHEMICAL CO., LTD (containing 10% by weight of zinc stearate)

Zinc oxide: "Ginrei R", manufactured by Toho Zinc Co., Ltd.

PBDS: bis(pentabromophenyl)disulfide, manufactured by Kawaguchi Chemical Industry Co., Ltd.

Dicumyl peroxide: a product of Tokyo Chemical Industry Co., Ltd.

Barium sulfate: "Barium Sulfate BD", manufactured by Sakai Chemical Industry Co., Ltd.

Oleic acid: a product of Tokyo Chemical Industry Co., Ltd. (unsaturated fatty acid, C18, (9), in formula (2), the number of carbon atoms of $R^{11}$ is 8, the number of carbon atoms of $R^{12}$ is 7, and ratio $(R^{11}/R^{12})=1.1$)

Zinc oleate: a product of Mitsuwa Chemicals Co., Ltd. (unsaturated fatty acid metal salt, C18, (9), in formula (2), the number of carbon atoms of $R^{11}$ is 8, the number of carbon atoms of $R^{12}$ is 7, and ratio $(R^{11}/R^{12})$ in number of carbon atoms=1.1)

Erucic acid: a product of Tokyo Chemical Industry Co., Ltd. (unsaturated fatty acid, C22, (13), in formula (2), the number of carbon atoms of $R^{11}$ is 8, the number of carbon atoms of $R^{12}$ is 11, and ratio $(R^{11}/R^{12})$ in number of carbon atoms=0.7)

Myristoleic acid: a product of Tokyo Chemical Industry Co., Ltd. (unsaturated fatty acid, C14, (9), in formula (2), the number of carbon atoms of $R^{11}$ is 4, the number of carbon atoms of $R^{12}$ is 7, and ratio $(R^{11}/R^{12})$ in number of carbon atoms=0.6)

10-undecylenic acid: a product of Nitto Kasei Co., Ltd. (unsaturated fatty acid, C11, (10), in formula (2), the number of carbon atoms of $R^{11}$ is 0, the number of carbon atoms of $R^{12}$ is 8, and ratio $(R^{11}/R^{12})$ in number of carbon atoms=0)

Zinc ricinoleate: a product of Nitto Kasei Co., Ltd. (unsaturated fatty acid metal salt, C18, (9), in formula (2), the number of carbon atoms of $R^{11}$ is 8 (OH is present at the third C), the number of carbon atoms of $R^{12}$ is 7, and ratio $(R^{11}/R^{12})$ in number of carbon atoms=1.1)

Stearic acid: a product of Tokyo Chemical Industry Co., Ltd. (saturated fatty acid)

Zinc stearate: a product of NISSHOKU TECHNO FINE CHEMICAL CO., LTD. (saturated fatty acid metal salt)

TABLE 5

Composition of Mid Layer (parts by weight)

| Type | M1 | M2 | M3 | M4 | M5 |
|---|---|---|---|---|---|
| Surlyn 8150 | — | 50 | — | — | — |
| Himilan 1605 | 47 | — | — | — | — |
| Himilan AM 7329 | 50 | 50 | — | 40 | — |
| Himilan AM 7337 | — | — | — | 26 | — |
| Himilan 1555 | — | — | 47 | — | 40 |
| Himilan 1557 | — | — | 46 | — | 40 |
| RABALON T3221C | 3 | — | 7 | 34 | 20 |
| Titanium dioxide | 3 | 3 | 3 | 3 | 3 |
| Hardness HmD (Shore D) | 63 | 68 | 57 | 43 | 49 |
| Hardness HmC (Shore C) | 93 | 98 | 86 | 70 | 79 |

TABLE 6

Composition of Cover (parts by weight)

| Type | C1 | C2 | C3 |
|---|---|---|---|
| Elastollan NY80A | 100 | — | — |
| Elastollan NY90A | — | 100 | — |
| Himilan AM 7329 | — | — | 50 |
| Himilan AM 7337 | — | — | 50 |
| Tinuvin 770 | 0.2 | 0.2 | 0.2 |
| Titanium dioxide | 4 | 4 | 4 |
| Ultramarine blue | 0.04 | 0.04 | 0.04 |
| Hardness Hc (Shore D) | 27 | 38 | 66 |

TABLE 7

Results of Evaluation

| | Ex. 1 | Ex. 2 | Ex. 3 | Ex. 4 |
|---|---|---|---|---|
| Core | | | | |
| Composition | S2 | S3 | S4 | S5 |
| Diameter (mm) | 39.7 | 39.7 | 39.7 | 39.7 |
| Mid layer | | | | |
| Composition | M1 | M1 | M1 | M1 |
| Thickness Tm (mm) | 1.0 | 1.0 | 1.0 | 1.0 |
| Cover | | | | |
| Composition | C1 | C1 | C1 | C1 |
| Thickness Tc (mm) | 0.5 | 0.5 | 0.5 | 0.5 |
| Hs-H0 (Shore C) | 27.6 | 25.1 | 19.1 | 26.6 |
| D3 = H25-H0 (Shore C) | 11.4 | 11.4 | 11.4 | 12.3 |
| D4 = H50-H25 (Shore C) | 1.6 | 1.6 | 0.1 | 2.7 |
| D5 = H75-H50 (Shore C) | 10.3 | 8.8 | 6.3 | 8.3 |
| D1 = H75-H0 (Shore C) | 23.3 | 21.8 | 17.8 | 23.3 |
| D2 = Hs-H75 (Shore C) | 4.3 | 3.3 | 1.3 | 3.3 |
| D2/D1 (Shore C) | 0.18 | 0.15 | 0.07 | 0.14 |
| D6 = HmC-H75 (Shore C) | 15.3 | 16.3 | 19.3 | 15.8 |
| D7 = HmC-Hs (Shore C) | 11.0 | 13.0 | 18.0 | 12.5 |
| D8 = HmD-Hc (Shore D) | 36 | 36 | 36 | 36 |
| W#1 ball speed (m/s) | 73.3 | 73.4 | 73.3 | 73.4 |
| W#1 spin rate (rpm) | 2660 | 2670 | 2680 | 2700 |
| W#1 distance (yd) | 287.5 | 288.1 | 287.3 | 287.8 |
| SW spin rate (rpm) | 6520 | 6580 | 6680 | 6570 |

TABLE 8

Results of Evaluation

| | Ex. 5 | Ex. 6 | Ex. 7 | Ex. 8 |
|---|---|---|---|---|
| Core | | | | |
| Composition | S6 | S7 | S8 | S9 |
| Diameter (mm) | 39.7 | 39.7 | 39.7 | 39.7 |
| Mid layer | | | | |
| Composition | M1 | M1 | M1 | M1 |
| Thickness Tm (mm) | 1.0 | 1.0 | 1.0 | 1.0 |
| Cover | | | | |
| Composition | C1 | C1 | C1 | C1 |
| Thickness Tc (mm) | 0.5 | 0.5 | 0.5 | 0.5 |
| Hs-H0 (Shore C) | 23.3 | 24.9 | 26.6 | 25.4 |
| D3 = H25-H0 (Shore C) | 11.1 | 9.9 | 11.9 | 11.3 |
| D4 = H50-H25 (Shore C) | 1.3 | 2.9 | 1.6 | 1.5 |

TABLE 8-continued

Results of Evaluation

| | Ex. 5 | Ex. 6 | Ex. 7 | Ex. 8 |
|---|---|---|---|---|
| D5 = H75-H50 (Shore C) | 7.8 | 8.1 | 9.3 | 9.1 |
| D1 = H75-H0 (Shore C) | 20.2 | 20.9 | 22.8 | 21.9 |
| D2 = Hs-H75 (Shore C) | 3.1 | 4.0 | 3.8 | 3.5 |
| D2/D1 (Shore C) | 0.15 | 0.19 | 0.17 | 0.16 |
| D6 = HmC-H75 (Shore C) | 17.1 | 16.2 | 16.3 | 16.4 |
| D7 = HmC-Hs (Shore C) | 14.0 | 12.2 | 12.5 | 12.9 |
| D8 = HmD-Hc (Shore D) | 36 | 36 | 36 | 36 |
| W#1 ball speed (m/s) | 73.5 | 73.3 | 73.3 | 73.4 |
| W#1 spin rate (rpm) | 2720 | 2670 | 2680 | 2620 |
| W#1 distance (yd) | 288.4 | 287.2 | 287.0 | 288.5 |
| SW spin rate (rpm) | 6600 | 6560 | 6570 | 6580 |

TABLE 9

Results of Evaluation

| | Ex. 9 | Ex. 10 | Ex. 11 | Ex. 12 |
|---|---|---|---|---|
| Core | | | | |
| Composition | S3 | S3 | S3 | S3 |
| Diameter (mm) | 39.7 | 39.7 | 39.7 | 39.7 |
| Mid layer | | | | |
| Composition | M2 | M3 | M1 | M2 |
| Thickness Tm (mm) | 1.0 | 1.0 | 1.0 | 1.0 |
| Cover | | | | |
| Composition | C1 | C1 | C2 | C2 |
| Thickness Tc (mm) | 0.5 | 0.5 | 0.5 | 0.5 |
| Hs-H0 (Shore C) | 25.1 | 25.1 | 25.1 | 25.1 |
| D3 = H25-H0 (Shore C) | 11.4 | 11.4 | 11.4 | 11.4 |
| D4 = H50-H25 (Shore C) | 1.6 | 1.6 | 1.6 | 1.6 |
| D5 = H75-H50 (Shore C) | 8.8 | 8.8 | 8.8 | 8.8 |
| D1 = H75-H0 (Shore C) | 21.8 | 21.8 | 21.8 | 21.8 |
| D2 = Hs-H75 (Shore C) | 3.3 | 3.3 | 3.3 | 3.3 |
| D2/D1 (Shore C) | 0.15 | 0.15 | 0.15 | 0.15 |
| D6 = HmC-H75 (Shore C) | 21.3 | 9.3 | 16.3 | 21.3 |
| D7 = HmC-Hs (Shore C) | 18.0 | 6.0 | 13.0 | 18.0 |
| D8 = HmD-Hc (Shore D) | 41 | 30 | 25 | 30 |
| W#1 ball speed (m/s) | 73.4 | 73.4 | 73.4 | 73.5 |
| W#1 spin rate (rpm) | 2630 | 2700 | 2640 | 2580 |
| W#1 distance (yd) | 288.7 | 287.6 | 288.6 | 290.4 |
| SW spin rate (rpm) | 6450 | 6640 | 6480 | 6430 |

TABLE 10

Results of Evaluation

| | Ex. 13 | Ex. 14 | Ex. 15 | Ex. 16 | Ex. 17 |
|---|---|---|---|---|---|
| Core | | | | | |
| Composition | S14 | S15 | S16 | S17 | S3 |
| Diameter (mm) | 39.7 | 39.7 | 39.7 | 39.7 | 39.7 |
| Mid layer | | | | | |
| Composition | M1 | M1 | M1 | M1 | M5 |
| Thickness Tm (mm) | 1.0 | 1.0 | 1.0 | 1.0 | 1.0 |
| Cover | | | | | |
| Composition | C1 | C1 | C1 | C1 | C1 |
| Thickness Tc (mm) | 0.5 | 0.5 | 0.5 | 0.5 | 0.5 |
| Hs-H0 (Shore C) | 24.2 | 25.9 | 24.6 | 20.8 | 25.1 |
| D3 = H25-H0 (Shore C) | 6.8 | 9.6 | 8.0 | 9.1 | 11.4 |
| D4 = H50-H25 (Shore C) | 2.9 | 2.0 | 5.0 | 2.3 | 1.6 |
| D5 = H75-H50 (Shore C) | 11.3 | 7.9 | 9.4 | 5.6 | 8.8 |
| D1 = H75-H0 (Shore C) | 21.0 | 19.5 | 22.4 | 17.0 | 21.8 |
| D2 = Hs-H75 (Shore C) | 3.2 | 6.4 | 2.2 | 3.8 | 3.3 |
| D2/D1 (Shore C) | 0.15 | 0.33 | 0.10 | 0.22 | 0.15 |
| D6 = HmC-H75 (Shore C) | 15.6 | 18.2 | 14.8 | 19.2 | 2.3 |
| D7 = HmC-Hs (Shore C) | 12.4 | 11.8 | 12.6 | 15.4 | −1.0 |
| D8 = HmD-Hc (Shore D) | 36 | 36 | 36 | 36 | 22 |
| W#1 ball speed (m/s) | 73.3 | 73.3 | 73.3 | 73.5 | 73.4 |
| W#1 spin rate (rpm) | 2660 | 2640 | 2640 | 2780 | 2760 |
| W#1 distance (yd) | 287.3 | 287.5 | 287.4 | 287.9 | 287.1 |
| SW spin rate (rpm) | 6540 | 6520 | 6490 | 6610 | 6690 |

TABLE 11

Results of Evaluation

| | Comp. Ex. 1 | Comp. Ex. 2 | Comp. Ex. 3 | Comp. Ex. 4 | Comp. Ex. 5 |
|---|---|---|---|---|---|
| Core | | | | | |
| Composition | S1 | S10 | S11 | S12 | S13 |
| Diameter (mm) | 39.7 | 39.7 | 39.7 | 39.7 | 39.7 |
| Mid layer | | | | | |
| Composition | M1 | M1 | M1 | M1 | M1 |
| Thickness Tm (mm) | 1.0 | 1.0 | 1.0 | 1.0 | 1.0 |
| Cover | | | | | |
| Composition | C1 | C1 | C1 | C1 | C1 |
| Thickness Tc (mm) | 0.5 | 0.5 | 0.5 | 0.5 | 0.5 |
| Hs-H0 (Shore C) | 27.8 | 31.5 | 33.4 | 31.0 | 28.1 |
| D3 = H25-H0 (Shore C) | 11.2 | 12.0 | 12.3 | 12.0 | 11.2 |
| D4 = H50-H25 (Shore C) | 1.2 | 2.1 | 2.6 | 1.8 | 2.9 |
| D5 = H75-H50 (Shore C) | 8.8 | 9.9 | 10.5 | 9.6 | 6.0 |
| D1 = H75-H0 (Shore C) | 21.2 | 24.0 | 25.4 | 23.4 | 20.1 |
| D2 = Hs-H75 (Shore C) | 6.6 | 7.5 | 8.0 | 7.6 | 8.0 |
| D2/D1 (Shore C) | 0.31 | 0.31 | 0.31 | 0.32 | 0.40 |
| D6 = HmC-H75 (Shore C) | 15.4 | 15.5 | 15.4 | 16.2 | 16.5 |
| D7 = HmC-Hs (Shore C) | 8.8 | 8.0 | 7.4 | 8.6 | 8.5 |
| D8 = HmD-Hc (Shore D) | 36 | 36 | 36 | 36 | 36 |
| W#1 ball speed (m/s) | 73.1 | 73.2 | 73.2 | 73.2 | 73.2 |
| W#1 spin rate (rpm) | 2620 | 2660 | 2680 | 2700 | 2650 |
| W#1 distance (yd) | 286.2 | 286.4 | 286.6 | 286.3 | 286.8 |
| SW spin rate (rpm) | 6380 | 6350 | 6330 | 6380 | 6380 |

TABLE 12

Results of Evaluation

| | Comp. Ex. 6 | Comp. Ex. 7 |
|---|---|---|
| Core | | |
| Composition | S3 | S3 |
| Diameter (mm) | 39.7 | 39.7 |
| Mid layer | | |
| Composition | M4 | M3 |
| Thickness Tm (mm) | 1.0 | 1.0 |
| Cover | | |
| Composition | C1 | C3 |
| Thickness Tc (mm) | 0.5 | 0.5 |
| Hs-H0 (Shore C) | 25.1 | 25.1 |
| D3 = H25-H0 (Shore C) | 11.4 | 11.4 |
| D4 = H50-H25 (Shore C) | 1.6 | 1.6 |
| D5 = H75-H50 (Shore C) | 8.8 | 8.8 |
| D1 = H75-H0 (Shore C) | 21.8 | 21.8 |
| D2 = Hs-H75 (Shore C) | 3.3 | 3.3 |
| D2/D1 (Shore C) | 0.15 | 0.15 |
| D6 = HmC-H75 (Shore C) | −6.7 | 9.3 |
| D7 = HmC-Hs (Shore C) | −10.0 | 6.0 |
| D8 = HmD-Hc (Shore D) | 16.0 | −9.0 |
| W#1 ball speed (m/s) | 73.3 | 73.6 |

TABLE 12-continued

| Results of Evaluation | | |
|---|---|---|
| | Comp. Ex. 6 | Comp. Ex. 7 |
| W#1 spin rate (rpm) | 2800 | 2460 |
| W#1 distance (yd) | 286.2 | 291.7 |
| SW spin rate (rpm) | 6720 | 5820 |

As shown in Tables 7 to 12, the golf ball of each Example is excellent in various performance characteristics. From the results of evaluation, advantages of the present invention are clear.

The golf ball according to the present invention can be used for playing golf on golf courses and practicing at driving ranges. The above descriptions are merely illustrative examples, and various modifications can be made without departing from the principles of the present invention.

What is claimed is:

1. A golf ball comprising a spherical core, a mid layer positioned outside the core, and a cover positioned outside the mid layer, wherein
a hardness H75 at a point to which a distance from a central point of the core is equal to 75% of a radius of the core is greater than a hardness H0 at the central point of the core, and a difference D1=(H75−H0) between the hardness H75 and the hardness H0 is not less than 10.0 and not greater than 27.0 in Shore C hardness,
a hardness Hs at a surface of the core is greater than the hardness H75, and a difference D2=(Hs−H75) between the hardness Hs and the hardness H75 is not less than 0 and not greater than 6.5 in Shore C hardness,
the hardness H75 is less than a Shore C hardness HmC of the mid layer, and
a Shore D hardness HmD of the mid layer is greater than a Shore D hardness Hc of the cover,
wherein a ratio (D2/D1) of the difference D2 to the difference D1 is not greater than 0.25 in Shore C hardness.

2. The golf ball according to claim 1, wherein a hardness H25 at a point to which a distance from the central point of the core is equal to 25% of the radius of the core is greater than the hardness H0, and a difference D3=(H25−H0) between the hardness H25 and the hardness H0 is not less than 7.0 in Shore C hardness.

3. The golf ball according to claim 1, wherein a difference D4=(H50−H25) between a hardness H50 at a point to which a distance from the central point of the core is equal to 50% of the radius of the core and the hardness H25 is not less than −3.0 and not greater than 3.0 in Shore C hardness.

4. The golf ball according to claim 1, wherein the hardness H75 is greater than the hardness H50, and a difference D5=(H75−H50) between the hardness H75 and the hardness H50 is not less than 6.0 in Shore C hardness.

5. The golf ball according to claim 1, wherein a difference D6=(HmC−H75) between the hardness HmC and the hardness H75 is not less than 7.0 in Shore C hardness.

6. The golf ball according to claim 1, wherein the hardness HmC is greater than the hardness Hs, and a difference D7=(HmC−Hs) between the hardness HmC and the hardness Hs is not less than 4.0 in Shore C hardness.

7. The golf ball according to claim 1, wherein a difference D8=(HmD−Hc) between the hardness HmD and the hardness Hc is not less than 20.0 in Shore D hardness.

8. The golf ball according to claim 1, wherein the core is formed from a rubber composition, and the rubber composition of the core includes (a) a base rubber, (b) a co-crosslinking agent that is an α,β-unsaturated carboxylic acid having 3 to 8 carbon atoms and/or a metal salt thereof, (c) a crosslinking initiator, and (d) an unsaturated fatty acid and/or a metal salt thereof (except the α,β-unsaturated carboxylic acid having 3 to 8 carbon atoms and the metal salt thereof).

9. The golf ball according to claim 8, wherein a number of carbon atoms of a fatty acid component of the unsaturated fatty acid and/or the metal salt thereof (d) is not less than 4 and not greater than 33.

10. The golf ball according to claim 8, wherein the unsaturated fatty acid and/or the metal salt thereof (d) has one or two carbon-carbon double bonds.

* * * * *